United States Patent
Takahata et al.

(10) Patent No.: US 9,911,972 B2
(45) Date of Patent: Mar. 6, 2018

(54) NON-AQUEOUS ELECTROLYTE SECONDARY BATTERY AND METHOD FOR MANUFACTURING NEGATIVE ELECTRODE FOR SECONDARY BATTERY

(75) Inventors: Koji Takahata, Toyota (JP); Tatsuya Hashimoto, Osaka (JP); Yoshiyuki Ozaki, Neyagawa (JP); Yukihiro Okada, Shijyonawate (JP); Kenji Tsuchiya, Toyota (JP); Masanori Kitayoshi, Toyota (JP); Naoyuki Wada, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 718 days.

(21) Appl. No.: 14/364,839

(22) PCT Filed: Dec. 14, 2011

(86) PCT No.: PCT/JP2011/078971
§ 371 (c)(1),
(2), (4) Date: Sep. 30, 2014

(87) PCT Pub. No.: WO2013/088540
PCT Pub. Date: Jun. 20, 2013

(65) Prior Publication Data
US 2015/0030931 A1    Jan. 29, 2015

(51) Int. Cl.
*H01M 4/133* (2010.01)
*H01M 4/62* (2006.01)
(Continued)

(52) U.S. Cl.
CPC ......... *H01M 4/133* (2013.01); *H01M 4/0402* (2013.01); *H01M 4/0404* (2013.01);
(Continued)

(58) Field of Classification Search
CPC ...... H01M 4/133; H01M 4/625; H01M 4/587; H01M 4/0402; H01M 4/0404; H01M 4/0416
See application file for complete search history.

(56) References Cited

U.S. PATENT DOCUMENTS

2001/0014422 A1* 8/2001 Omaru ................. H01M 2/348
429/231.1
2007/0148550 A1    6/2007 Hasegawa et al.
(Continued)

FOREIGN PATENT DOCUMENTS

JP    4-155776    5/1992
JP    10-321219    12/1998
(Continued)

OTHER PUBLICATIONS

Machine Translation of: JP 2004/220926 A, Komori et al., Aug. 5, 2004.*
(Continued)

*Primary Examiner* — Kenneth J Douyette
(74) *Attorney, Agent, or Firm* — Finnegan, Henderson, Farabow, Garrett & Dunner, LLP

(57) ABSTRACT

The non-aqueous electrolyte secondary battery 10 provided by the present invention comprises a positive electrode 30, a negative electrode 50 and a non-aqueous electrolyte. The negative electrode 50 includes a negative electrode current collector 52 and a negative electrode active material layer 54 formed on the current collector 52, the negative electrode active material layer 54 containing a negative electrode active material 55 capable of storing and releasing charge carriers and having shape anisotropy so that the charge carriers are stored and released along a predefined direction. The negative electrode active material layer 54 includes, at a bottom thereof contacting the current collector 52, a minute conductive material 57 with granular shape and/or
(Continued)

minute conductive material 57 with fibrous shape having an average particle diameter that is smaller than that of the negative electrode active material 55, and includes, at the bottom thereof, a part of the negative electrode active material 55. At least 50% by number of the total amount of the negative electrode active material 55 is oriented so that the direction of storage and release of the charge carriers is at an angle of 45° or more and 90° or less relative to the surface of the current collector 52.

15 Claims, 14 Drawing Sheets

(51) Int. Cl.
*H01M 4/587* (2010.01)
*H01M 10/058* (2010.01)
*H01M 4/1393* (2010.01)
*H01M 10/0525* (2010.01)
*H01M 4/04* (2006.01)
*H01M 4/02* (2006.01)

(52) U.S. Cl.
CPC ....... *H01M 4/0416* (2013.01); *H01M 4/1393* (2013.01); *H01M 4/587* (2013.01); *H01M 4/625* (2013.01); *H01M 10/058* (2013.01); *H01M 10/0525* (2013.01); *H01M 2004/021* (2013.01); *H01M 2004/027* (2013.01); *Y02T 10/7011* (2013.01); *Y10T 29/49115* (2015.01)

(56) References Cited

U.S. PATENT DOCUMENTS

| | | | |
|---|---|---|---|
| 2007/0231690 A1* | 10/2007 | Fujita | H01M 4/131 429/209 |
| 2009/0117462 A1* | 5/2009 | Okazaki | H01M 4/04 429/218.1 |
| 2010/0129711 A1* | 5/2010 | Kashiwagi | H01M 4/13 429/209 |
| 2012/0164530 A1 | 6/2012 | Temmyo et al. | |

FOREIGN PATENT DOCUMENTS

| | | |
|---|---|---|
| JP | 2004-220926 | 8/2004 |
| JP | 2006-253126 | 9/2006 |
| JP | 2010-102873 | 5/2010 |
| WO | WO 2012/001840 | 1/2012 |

OTHER PUBLICATIONS

Machine Translation of: JP 2006/253126 A, Sato et al., Sep. 21, 2006.*
"Denka Black Product Information", p. 1-2, retrieved online on Feb. 13, 2017 from: http://www.denka.co.jp/eng/scm/product/scm/detail_003360.html.*

* cited by examiner

NON-AQUEOUS ELECTROLYTE SECONDARY BATTERY AND METHOD FOR MANUFACTURING NEGATIVE ELECTRODE FOR SECONDARY BATTERY

CROSS-REFERENCE TO RELATED APPLICATIONS

This application is a national phase application of International Application No, PCT/JP2011/078071, filed Dec. 12, 2011, the content of which is incorporated herein by reference.

TECHNICAL FIELD

The present invention relates to a non-aqueous electrolyte secondary battery and a method for producing a negative electrode for a secondary battery. Specifically, the present invention relates to a non-aqueous electrolyte secondary battery including a negative electrode which contains an oriented negative electrode active material.

BACKGROUND ART

Non-aqueous electrolyte secondary batteries (typically lithium ion batteries) have recently become increasingly important as high output power supplies for vehicles and power supplies for electric power storage systems because of the light weight and high energy density thereof. In order to further increase the input and output power, reduction in internal resistance of the batteries has been attempted.

A typical configuration of the type of the non-aqueous electrolyte secondary battery includes electrodes (a positive electrode and a negative electrode) carrying electrode active material layers containing electrode active materials on electrode current collectors. The electrode is typically formed by applying a paste for forming an electrode active material layer containing the electrode active material, a binder and the like on the surface of the current collector, drying the layer and then pressing the layer so as to obtain a predetermined density (a so-called application method).

Widely known negative electrode active materials included in negative electrodes may include graphite materials including natural graphite, artificial graphite and amorphous carbon of natural graphite or artificial graphite. Such graphite materials have laminar structures containing a plurality of planes formed with carbon six-membered rings (which are also referred to as graphene and correspond to the (002) planes in the graphite crystal structure) stacked together. Charge and discharge are the results of insertion (storage) of lithium ions between the layers (interlaminar) and elimination (release) from the interlaminar space. Various devices have been proposed in order to improve performances of negative electrodes containing such graphite materials as a negative electrode active material.

For example, Patent Literature 1 discloses orientation of a negative electrode active material of a graphite type by applying a magnetic field to a negative electrode active material composition layer containing the negative electrode active material while the layer is in a viscous state. It is disclosed that, according to this technique, lithium can migrate through the interlaminar spaces of the oriented graphite via a substantially linear route or an approximated route thereof and the graphite existing inside of the negative electrode active material layer can contribute to charge and discharge, resulting in an improvement in battery charge and discharge capacity. It has been known that, when graphite is arranged so that the plane direction of the graphite is perpendicular to a current collector for example, lithium can be smoothly inserted to and eliminated from the interlaminar spaces of graphite, resulting in reduction in resistance and an improvement in output and input properties.

Patent Literature 2 discloses a negative electrode active material which is a composite carbon material containing a graphite material obtained by heat treatment of coke and vapour grown carbon fibre (VGCF). It is described that according to this configuration, swelling of electrodes can be further prevented compared to the electrodes containing only the graphite material upon charge and discharge and an increased capacity can be realized compared to the electrodes containing only the VGCF, resulting in provision of negative electrodes for secondary batteries having excellent cycle properties, high voltage and high capacity.

CITATION LIST

Patent Literature

Patent Literature 1: Japanese Patent Application Laid-open No. H10-321219

Patent Literature 2: Japanese Patent Application Laid-open No. H04-155776

Patent Literature 3: Japanese Patent Application Laid-open No. 2010-102873

SUMMARY OF INVENTION

Technical Problem

Meanwhile the batteries for use in driving vehicles as described above are required to have low reaction resistance during charge and discharge and thus improved input and output properties in order to improve energy efficiency, for example. From this standpoint, it has been difficult to obtain a negative electrode for lithium ion secondary batteries having a sufficient capacity only by orienting the (002) planes of a graphite material so as to be perpendicular to a negative electrode current collector by means of magnetic orientation, in addition, when compaction treatment by press is performed to the graphite material having the (002) planes oriented so as to be perpendicular to the negative electrode current collector, the orientation of the graphite material is difficult to be retained, the problem of a deterioration of input and output properties is arised.

The present invention has been achieved in view of the foregoing and has a main object to provide a non-aqueous electrolyte secondary battery containing an electrode active material oriented at a high density state and thus having improved input and output properties and capacitance characteristics and a method for producing an electrode for the non-aqueous electrolyte secondary battery having such properties.

Solution to Problem

The non-aqueous electrolyte secondary battery according to the present invention includes a positive electrode, a negative, electrode and a non-aqueous electrolyte. In the non-aqueous electrolyte secondary battery, the negative electrode includes a negative electrode current collector, and a negative electrode active material layer formed on the current collector and containing a negative electrode active material capable of storing and releasing charge carriers and having shape anisotropy so that the charge carriers are stored and released along a predefined direction. A minute conductive material with granular shape and/or minute conductive material with fibrous shape having an average particle diameter that is smaller than an average particle diameter of the negative electrode active material at a bottom of the negative electrode active material layer contacting the current collector, and a part of the negative electrode active material is included at the bottom. At least 50% by number (number percentage) of the total amount of the negative electrode active material is oriented so that a direction of storage and release of the charge carriers is at an angle of 45° or more and 90° or less relative to the surface of the current collector.

According to the above configuration, more than half of the negative electrode active material in the negative electrode active material layer is supported at the bottom of the negative electrode active material layer by the above conductive base accumulated layer in the state that the direction of storage and release of the charge carriers is oriented at an angle of 45° or more and 90° or less relative to the surface of the current collector. Thus the resistance against migration of the charge carriers from the surface of the negative electrode active material layer towards the current collector is reduced, resulting in smooth migration thereof. Accordingly the non-aqueous electrolyte secondary battery can be obtained that has low resistance and excellent input and output properties.

According to a preferable aspect of the non-aqueous electrolyte secondary battery disclosed herein, the minute conductive material may be a fibrous carbon material having an average fibre diameter of 1 μm or less and/or a granular carbon material having an average particle diameter of 1 μm or less. According to this configuration, the conductive base accumulated layer can secure conductivity of the negative electrode while firmly supporting the negative electrode active material.

According to a preferable aspect of the non-aqueous electrolyte secondary battery disclosed herein, the negative electrode active material may be a graphite material with flake shape or a graphite material with fibrous shape and at least 50% by number of the graphite material in the negative electrode active material layer is oriented so that an angle of the (004) plane thereof relative to the surface of the current collector is 45° or more and 90° or less. The graphite material, i.e., the graphite material with flake shape and the graphite material with fibrous shape has high theoretical capacity for lithium ions and thus has excellent conductivity. The graphite with flake shape may have a laminar structure in which a plurality of planes formed with carbon six-membered rings (i.e., planes equivalent to the (004) plane) is stacked, allowing migration of lithium ions through the interlaminar spaces. The graphite material with fibrous shape may have a plane formed with carbon six-membered rings (i.e., a plane equivalent to the (004) plane) that is rounded to be a tube shape, allowing migration of lithium ions along the axial direction. Because the graphite material has the (004) plane oriented so that the angle thereof relative to the surface of the current collector is 45° or more and 90° or less, migration as well as insertion (storage) and elimination (release) of the charge carriers such as lithium ions from the surface of the electrode active material layer towards the current collector are facilitated. Accordingly the non-aqueous electrolyte secondary battery can have high capacity, low resistance and excellent input and output properties.

The negative electrode active material layer may have a ratio I(110)/I(004) of the diffraction intensity of the (110) plane relative to the diffraction intensity of the (004) plane in X-ray diffraction of the surface thereof of 0.6 or more and 1.0 or less. The graphite material which is the negative electrode active material shows, in the X-ray diffraction pattern thereof, a peak belonging to the (004) plane and a peak belonging to the (110) plane. The (110) plane in the crystal structure of the graphite material is a plane perpendicular to the plane formed with carbon six-membered rings (i.e., a plane equivalent to the (004) plane), and thus the ratio between the peak intensity of the (110) plane and the peak intensity of the (004) plane in X-ray diffraction represents the crystal orientation of the graphite material. An increased value for the I(110)/I(004) in X-ray diffraction of the surface of a negative electrode active material layer indicates an increased orientation of the (004) plane towards the direction perpendicular to the surface of the negative electrode active material layer (typically aligned in the direction perpendicular to the surface of a current collector). According to this configuration wherein the I(110)/I(004) is as high as 0.6 or more and 1.0 or less, a non-aqueous electrolyte secondary battery having low resistance and high output can be obtained.

According to a preferable aspect of the non-aqueous electrolyte secondary battery disclosed herein, the negative electrode active material layer may have a density of at least 1.5 g/cm$^3$. According to this configuration, the electrode active material layer contains the negative electrode active material at high density, resulting in provision of the non-aqueous electrolyte secondary battery having high capacity.

According to a preferable aspect of the non-aqueous electrolyte secondary battery disclosed herein, a binder may be included at 1.0 part by mass or less relative to 100 parts by mass of the negative electrode active material, in the non-aqueous electrolyte secondary battery, the negative electrode active material is firmly supported by the conductive base accumulated layer at the bottom of the negative electrode active material layer and the negative electrode active material mutually support each other by means of shape anisotropy of the negative electrode active material at the upper portion of the layer. Accordingly the amount of the binder which sticks the negative electrode active material in the negative electrode active material layer can be decreased.

The non-aqueous electrolyte secondary battery may have excellent properties such as low resistance and high input and output properties due to high orientation as described above and high capacitance characteristics due to high density. Accordingly, a vehicle including the non-aqueous electrolyte secondary battery (which may be an assembled battery including a plurality of non-aqueous electrolyte secondary batteries connected each other) disclosed herein as a power source (typically a power source of a hybrid vehicle or an electric vehicle) is suitably provided.

A method for producing a negative electrode for a secondary battery provided by the present invention is a method for producing a negative electrode for a secondary battery including a negative electrode active material layer formed on a negative electrode current collector, wherein the method includes the following steps:

1: preparing a composition for forming a negative electrode active material layer including a negative electrode active material capable of storing and releasing charge carriers and having shape anisotropy so that the charge carriers are stored and released along a predefined direction;

2: preparing a composition for forming a conductive base accumulated layer including a minute conductive material with granular shape and/or a minute conductive material with fibrous shape having an average particle diameter that is smaller than that of the negative electrode active material;

3: applying the composition for forming a conductive base accumulated layer on a given negative electrode current collector;

4: applying, before the composition for forming a conductive base accumulated layer applied on the current collector is dried, the composition for forming a negative electrode active material layer on the applied composition for forming a conductive base accumulated layer to form the negative electrode active material layer; and 5: applying, to the negative electrode active material layer, a magnetic field having magnetic force lines aligned in a direction orthogonal to the surface of the current collector in order to orient the negative electrode active material.

In the step of orientation, at least 50% by number of the total amount of the negative electrode active material is oriented so that a direction of storage and release of the charge carriers is at an angle of 45° or more and 90° or less relative to the surface of the current collector.

According to the above configuration, the magnetic field is applied along the direction orthogonal to the surface of the current collector in the step of orientation, and thus the negative electrode active material are arranged so that the direction of storage and release of the charge carriers is at an angle of 45° or more and 90° or less relative to the surface of the current collector. The negative electrode active material contained at the bottom of the negative electrode active material layer is supported so that a part thereof is sandwiched between the minute conductive material. Accordingly the negative electrode active material retain the orientation thereof even after the subsequent step of pressure extension as well as the negative electrode active material layer has high density. Thus the negative electrode for secondary batteries having low resistance and high output properties can be produced.

According to a preferable aspect of the method for producing the negative electrode for a secondary battery disclosed herein, a fibrous carbon material having an average fibre diameter of 1 μm or less and/or a granular carbon material having an average particle diameter of 1 μm or less may be used as the minute conductive material. By using the minute conductive material having the above shape and dimension, the negative electrode active material oriented along the direction approximately orthogonal to the surface of the current collector can be surely supported by a reduced amount of the minute conductive material in the negative electrode.

According to a preferable aspect of the method for producing the negative electrode for a secondary battery disclosed herein, a graphite material with flake shape or a graphite material with fibrous shape may be used as the negative electrode active material, and the graphite material is oriented in the step of orientation so that an angle of the (004) plane of at least 50% by number of the graphite material in the negative electrode active material layer is 45° or more and 90° or less relative to the surface of the current collector. According to this configuration, the negative electrode for a secondary battery having high capacity, low resistance and high output properties can be produced because the negative electrode active material containing the graphite material having high theoretical capacity and excellent conductivity are oriented.

According to a preferable aspect of the method for producing the negative electrode for a secondary battery disclosed herein, the negative electrode active material are oriented in the step of orientation so that the negative electrode active material layer has the ratio $I(110)/I(004)$ of the diffraction intensity of the (110) plane relative to the diffraction intensity of the (004) plane in X-ray diffraction of the surface thereof; of 0.6 or more and 1.0 or less. Accordingly, the negative electrode active material containing graphite are oriented at a high orientation degree and thus the negative electrode for a secondary battery having further excellent input and output properties can be produced.

According to a preferable aspect of the method for producing the negative electrode for a secondary battery disclosed herein, the magnetic field applied in the step of orientation has an intensity of 0.5 T or more. According to this configuration, the negative electrode active material can be surely oriented.

According to a preferable aspect of the method for producing the negative electrode for a secondary battery disclosed herein, the method further includes the step of extending by applying pressure the negative electrode active material layer obtained after the step of orientation so that the negative electrode active material layer has a density of at least 1.5 g/cm$^3$. According to this configuration, the method for producing a nonaqueous electrolyte secondary battery having a further increased capacity can be provided.

According to a preferable aspect of the method for producing the negative electrode for a secondary battery disclosed herein, the composition for forming a negative electrode active material layer includes a binder at 1.0 part by mass or less relative to 100 parts by weight of the negative electrode active material. According to this configuration, the amount of the binder forming the negative electrode active material layer is reduced and thus the nonaqueous electrolyte secondary battery having further reduced resistance can be produced.

A method for producing a nonaqueous electrolyte secondary battery provided by the present invention includes the step of preparing a positive electrode, a negative electrode and a non-aqueous electrolyte, and the step of assembling a non-aqueous electrolyte secondary batter by using the positive electrode, the negative electrode and the non-aqueous electrolyte, wherein the negative electrode produced by the above method is used as the negative electrode. According to this method, the secondary battery having high capacity, low resistance and high input and output properties can be produced. Namely, a method for producing the non-aqueous electrolyte secondary battery suitable fir batteries for vehicles such as automobiles is provided.

DESCRIPTION OF EMBODIMENTS

The term "secondary battery" as used herein generally refers to a repeatedly rechargeable battery such as lithium secondary batteries and nickel-metal hydride batteries. The term "lithium secondary battery" as used herein generally refers to a repeatedly rechargeable battery which uses lithium ions as charge carriers and typically encompasses lithium ion batteries, lithium polymer batteries and the like.

The term "active material" as used herein refers to a substance that can reversibly store and release (typically insert and eliminate) chemical species serving as charge carriers (e.g., lithium ions in lithium ion batteries) in secondary batteries.

The term "shape anisotropy" means a geometrically developed shape of a substance itself in a specific orientation (typically in a one-dimensional direction or on a two-dimensional plane).

The non-electrolyte secondary battery provided by the present invention is a secondary battery including a positive electrode, a negative electrode and a non-aqueous electrolyte and is characterized by the configuration of the negative electrode. First, the present invention is described by way of a structural example of a negative electrode for lithium ion secondary batteries as an embodiment of the negative electrode. Then, the lithium ion secondary battery according to an embodiment of the present invention is described by appropriately referring the structural example. In the following figures, the members and positions exhibiting the same effect are denoted by the same symbols. The dimensional relation (length, width, thickness, etc.) in the figures do not reflect the actual dimensional relation. The matters, which are other than the matters particularly referred to in this description and which are required for practice of the present invention (e.g., general techniques relating to the production method of the active material, a separator, an electrolyte and the like and relating to construction of the non-aqueous electrolyte secondary battery, etc.), are understood to be design matters by a person skilled in the art based on the conventional technique in the art.

<<Negative Electrode>>

Figure 5:
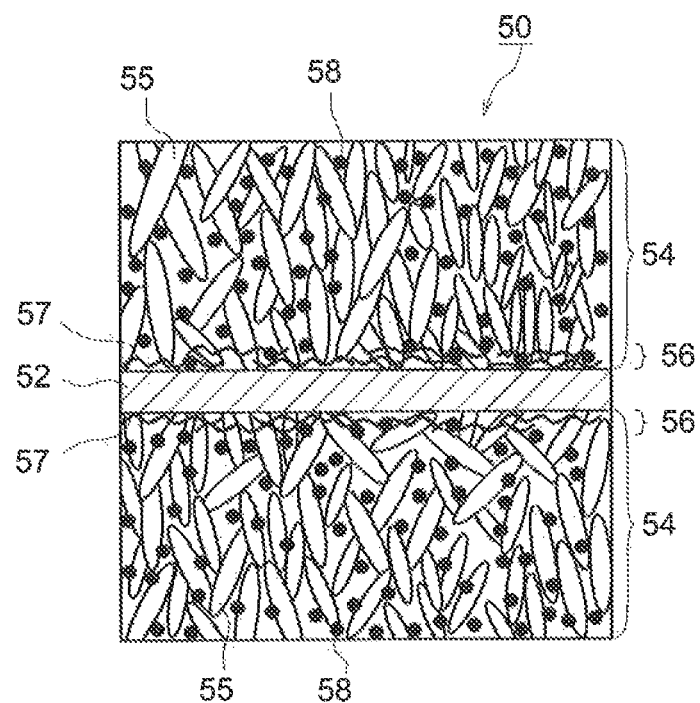
FIG. 5 is a schematic view illustrating a sectional structure of a negative electrode for secondary batteries according to an embodiment of the present invention.

FIG. 5 illustrates a section structure of a negative electrode 50 for lithium ion secondary batteries according to an embodiment. The negative electrode 50 includes a negative electrode current collector 52 and a negative electrode active material layer 54 formed on the current collector 52. The negative electrode active material layer 54 includes a negative electrode active material 55 which can store and release charge carriers and has shape anisotropy so that the charge carriers are stored and released along a predefined direction.

<Negative Electrode Current Collector 52>

A preferable embodiment of the negative electrode current collector 52 is, for example, a metal foil having high conductivity such as copper (Cu). However, the negative electrode current collector 52 is not necessarily limited to a metal foil. For example, the negative electrode current collector 52 may be a resin to which conductivity has been imparted. The resin to which conductivity has been imparted may be a film material containing a polypropylene film and copper deposited thereon.

<Negative Electrode Active Material Layer 54>

The negative electrode active material layer 54 typically includes, as shown in FIG. 5, the negative electrode active material 55 having shape anisotropy together with a minute conductive material 57 and a binder 58. The negative electrode active material layer 54 has, at the bottom thereof contacting the current collector 52, a conductive base accumulated layer 56. The minute conductive material 57 which has an average particle diameter that is smaller than that of the negative electrode active material 55 accumulates in the conductive base accumulated layer 56. Apart of the negative electrode active material 55 contained in the negative electrode active material layer 54 may be contained in the conductive base accumulated layer 56. Thus, at the bottom of the negative electrode active material layer 54, the negative electrode active material 55 is supported in the form that a part (an edge on the side of the negative electrode current collector 52) thereof is sandwiched by the minute conductive materials 57.

At least 50% by number of the total amount of the negative electrode active material 55 is oriented so that the direction of storage and release (namely, the direction along which shape anisotropy is exhibited) of the charge carriers is at an angle of 45° or more and 90° or less (hereinafter also merely referred to as approximately perpendicular) relative to the surface of the current collector. Preferably 75% by number or more, more preferably 85% by number or more and further specifically 90% by number or more of the total amount of the negative electrode active material 55 is oriented so that the direction relative to the negative electrode current collector 52 is approximately perpendicular. Substances showing such shape anisotropy may generally be arranged so that the longitudinal direction (namely, the direction along which shape anisotropy is exhibited) is approximately parallel to the surface of the negative electrode current collector 52. In contrast, the negative electrode active material 55 is arranged so as to be approximately perpendicular.

At the bottom of the negative electrode active material layer 54, the negative electrode active material 55 retain the orientation thereof while a part thereof (an edge on the side of the negative electrode current collector 52) penetrates into the minute conductive material 57 in the conductive base accumulated layer 56 and thus is firmly supported relative to the negative electrode current collector 52. The negative electrode active material 55 are oriented along the direction of shape anisotropy and thus the negative electrode active material 55 in the upper part may support each other to be densely arranged. Accordingly, even when the negative electrode active material layer 54 has a thickness, the orientation as above is preferably retained. The thickness of the negative electrode active material layer 54 is not particularly limited and may be, as an average thickness, about 10µ or more, 40 µm or more and 70 µm or less on one side of the negative electrode current collector 52, for example.

<Negative Electrode Active Material 55>

The negative electrode active material 55 may be a material which can store and release charge carriers and has shape anisotropy so that the charge carriers are stored and released along a predefined direction. The negative electrode active material 55 is not particularly limited as far as it can store and release charge carriers and has shape anisotropy in the direction of storage and release of the charge carriers. For example, the negative electrode active material 55 may be the one obtained by subjecting a material which allows migration of charge carriers in a specific direction to grow (to be formed) so that the specific direction or the specific plane is developed, or the one obtained by subjecting the material to processing so that the specific direction or the specific plane is developed. The negative electrode active material 55 may be the one which allow storage and release of charge carriers along a predefined direction by means of orientation of the negative electrode active material 55 along the shape anisotropy direction.

Such a negative electrode active material 55 has a particle diameter of about 3 µm or more and typically has an average particle diameter of 5 µm or more and 20 µm or less. The average particle diameter refers to a particle diameter in powder particle size distribution at the accumulated volume of 50%, namely D50 (median diameter). D50 can be easily measured on a particle size distribution analyser based on the laser diffraction scattered method (namely particle size distribution is determined from a scattered pattern obtained when a sample is irradiated with laser light). The average particle diameter of excessively higher than 20 µm is not preferable because diffusion of charge carriers into the central part of the negative electrode active material 55 takes time and thus effective capacity of the negative electrode may be reduced and because the procedure for orientation may be often difficult. The average particle diameter of excessively smaller than 5 µm is not preferable because the side reaction rate on the surface of the negative electrode active material may be increased and irreversible capacity of the obtained non-aqueous electrolyte secondary battery may be increased.

The negative electrode active material 55 desirably has shape magnetic anisotropy. The material having shape magnetic anisotropy may be easily oriented along the easy direction of magnetization by application of a magnetic field. A typical example of the material may include a graphite material having shape anisotropy. The graphite material may be natural graphite, artificial graphite, amorphous substances thereof and the like. The graphite materials have laminar structures containing a plurality of planes formed with carbon six-membered rings (which are also referred to as graphene and correspond to the (002) plane in the graphite crystal structure) stacked together. Charge and discharge are the results of insertion (storage) of charge carriers (e.g., lithium ions) between the layers (interlaminar) and elimination (release) from the interlaminar space. Graphite per se is magnetized and the easy direction of magnetization is within the (002) plane. Accordingly, the graphite material has shape anisotropy within the (002) plane.

The graphite having such shape magnetic anisotropy may be the one which is not in the form of approximately spherical particles in a strict sense. The negative electrode 50 disclosed herein may preferably be, for example, a graphite material with flake shape having a flat crystal structure developed in the direction of planes formed with carbon six-membered rings or a graphite material with fibrous shape (also encompassing a needle-like graphite material having a crystal structure developed into a needle-like shape) having a tissue developed in a fibrous shape. The graphite material with flake shape has the easy direction of magnetization along the direction of shape anisotropy within a plane formed with carbon six-membered rings. A graphite material with fibrous shape having, for example, the above graphene sheet that is rounded up to be a tube shape (typically a mono- or multi-layer carbon nano tube) has been widely known. The graphite material with fibrous shape allows migration of charge carriers (e.g., lithium ions) along the axial direction the direction parallel to the (002) plane), and the axial direction is an easy direction of magnetization (easy axis of magnetization). Needle-like graphite (needle coke) has a crystal tissue sufficiently developed into a needle form and the longitudinal direction of the needle graphite is aligned in the direction of aggressive growth of planes formed with carbon six-membered rings of graphite crystals. Thus, with regard to the needle-like graphite material, charge carriers (e.g., lithium ions) can migrate along the longitudinal direction (i.e., the direction parallel to the (002) plane) of the needles, the axial direction being the easy direction of magnetization (easy axis of magnetization). The graphite material may be, in addition to the above graphite materials, for example, vein graphite having high aspect ratio (an aspect ratio of 1 or more, preferably 1.2 or more and more preferably 1.5 or more) and the like.

When the negative electrode active material 55 is the graphite material with flake shape or the graphite material with fibrous shape (including needle-like graphite material; the same applies to the followings), at least 50% by number of the graphite material in the negative electrode active material layer 54 may be easily oriented so that the angle of the (004) plane thereof is 45° or more and 90° or less, preferably 60° or more and 90° or less and more preferably 80° or more and 90° or less relative to the surface of the current collector.

It is known that natural graphite has more complete crystal structure and has higher capacity than artificial graphite. From this point of view, the graphite material may be natural graphite.

The orientation of the negative electrode active material 55 can be evaluated by, for example, microscope observation of the section of the negative electrode 50 or by confirmation of orientation of the (004) plane. It is sufficient that at least 50% by number of the negative electrode active material 55 have the (004) plane oriented so as to be approximately perpendicular (45° or more and 90° or less) relative to the surface of the negative electrode current collector 52.

The state of orientation can be confirmed by observation of the orientation of the (002) plane or the (004) plane equivalent thereto by X-ray diffraction of the surface of the negative electrode active material layer 54. For example, the negative electrode active material layer preferably has the ratio I(110)/I(004) of the diffraction intensity of the (110) plane relative to the diffraction intensity of the (004) plane in X-ray diffraction of the surface thereof, of 0.6 or more and 1.0 or less.

According to X-ray diffraction analysis (wide-angle diffraction or out-of-plane method), diffraction profile of the lattice plane parallel to the surface of a sample can be obtained. The (004) plane and the (110) plane of graphite perpendicularly intersect. Accordingly the diffraction intensity ratio I(110)/I(004) indicates the ratio between the (004) plane parallel to the surface of a sample and the (110) plane parallel to the surface of the sample. A higher value means that the (004) plane is more perpendicular relative to the surface of the active material layer. The diffraction intensity ratio I(110)/I(004) is preferably 0.8 or more and more preferably 0.9 or more.

<Binder 58>

The binder 58 serves to bond particles of the negative electrode active material 55 in the negative electrode active material layer 54 and to bond the particles with the negative electrode current collector 52. The binder 58 may be a polymer which is soluble or dispersible in a solvent used for the production. For example, when an aqueous solvent is used for preparation of a composition for forming a negative electrode active material layer which is used for the production, the polymer material which is soluble in water (water soluble) may include cellulose polymers such as carboxymethylcellulose (CMC), methylcellulose (MC), cellulose acetate phthalate (CAP) and hydroxypropyl methylcellulose (HPMC); polyvinyl alcohol (PVA) and the like. The polymer material which is dispersible in water (water dispersible) may include vinyl polymers such as polyethylene (PE) and polypropylene (PP); polyethylene oxide (PEO), fluororesins such as polytetrafluoroethylene (PTFE), tetrafluoroethylene-hexafluoropropylene copolymers (PEP) and tetrafluoroethylene-perfluoroalkyl vinyl ether copolymers (PEA); vinyl acetate copolymers; rubbers such as styrene butadiene rubbers (SBR) and acrylate-modified SBR resins (SBR latex).

<Conductive Base Accumulated Layer 56>

The conductive base accumulated layer 56 is formed, as described above, at the bottom contacting the negative electrode current collector 52 as a part of the negative electrode active material layer 55. The conductive base accumulated layer 56 exists at a region about 3 μm or less, more specifically 2 μm or less from the surface of the negative electrode current collector 52. The conductive base accumulated layer 56 contains, in addition to the binder used for the negative electrode active material layer 54, a minute conductive material 57 with granular shape and/or minute conductive material 57 with fibrous shape having an average particle diameter that is smaller than that of the negative electrode active material 55 in a accumulated state.

In addition, in this region of about 3 μm or less from the surface of the negative electrode current collector 52, less than 10% by volume of the solid material (i.e., a portion excluding the void) is occupied by the negative electrode active material 55. Namely, in this region of about 3 μm or less from the surface of the negative electrode current collector 52, the minute conductive material 57 supports the negative electrode active material 55 which retains orientation thereof.

<Minute Conductive Material 57>

The minute conductive material 57 may be a minute conductive material with granular shape and/or a minute conductive material with fibrous shape having excellent conductivity and having an average particle diameter that is relatively smaller than that of the negative electrode active material. Namely, the minute conductive material 57 may or may not have shape anisotropy. In the example shown in FIG. 5, only the minute conductive material 57 which is fibrous is shown; however, the minute conductive material 57 may be either of granular and fibrous or may be both.

The minute conductive material 57 typically has a particle diameter (diameter of cross section) of less than about 3 μm. For example, the minute conductive material 57 may be suitably a granular carbon material having an average particle diameter of 0.3 μm to 2 μm and preferably 0.5 μm to 1 μm and/or a fibrous carbon material having an average fibre diameter of 0.2 μm to 2 μm and preferably 0.5 μm to 1 μm. Because of these dimensional characteristics, the minute conductive material 57 can be clearly distinguished from the negative electrode active material 55.

It is considered that although the minute conductive material 57 in the conductive base accumulated layer 56 are accumulated along the direction parallel to the surface of the negative electrode current collector 52, the particles are rarely stacked along the thickness direction of the conductive base accumulated layer 56. As such, the conductive base accumulated layer 56 is extremely thin relative to the negative electrode active material layer 54. However, because of the presence of the minute conductive material 57, the negative electrode active material 55 can be supported while retaining orientation thereof.

In this region of about 3 μm or less from the surface of the negative electrode current collector 52, the minute conductive material 57 accounts for about 85% by volume to 9% by volume, more specifically about 90% by volume to 95% by volume of the solid material (i.e., a portion excluding the void). As such, the proportion of the negative electrode active material 55, the minute conductive material 57 and the binder in the conductive base accumulated layer 56 may be appropriately adjusted so as to by, specifically, the negative electrode active material 55:minute conductive material 57:binder about 5:94:1.

The minute conductive material 57 may be, for example, a conductive material, among various conductive materials conventionally used for this type of batteries, having a minute average particle diameter or a minute average cross section diameter, which may specifically include, for example, carbon materials such as carbon powder and carbon fibres. The carbon powder may be various carbon black (e.g., acetylene black, furnace black, ketjen black), graphite powder and the like. The minute conductive material is preferably carbon fibres having an average fibre diameter of 1 μm or less, or small particle diameter graphite powder having an average particle diameter of 1 μm or less. One or two or more of these materials may be used.

In the negative electrode active material layer 54 as above, the negative electrode active material 55 are densely arranged while supporting each other and thus the negative electrode active material layer 54 may have an increased density. The density of the negative electrode active material layer 54 is not particularly limited and may suitably be as high as at least 1.5 g/cm$^3$, for example.

In the negative electrode active material layer 54, the negative electrode active material 55 are supported by the minute conductive material 57 or mutually support each other, and thus the amount of the binder required for binding particles of the negative electrode active material 55 may be reduced. Thus the negative electrode active material layer 54 contains the binder at, relative to 100 parts by mass of the negative electrode active material, 1.4 parts by mass or less, typically 1.0 part by mass or less. The amount of the binder in the negative electrode active material layer 54 is preferably, relative to 100 parts by mass of the negative electrode active material, 0.7 parts by mass or less and more preferably 0.3 parts by mass or less.

Figure 1:
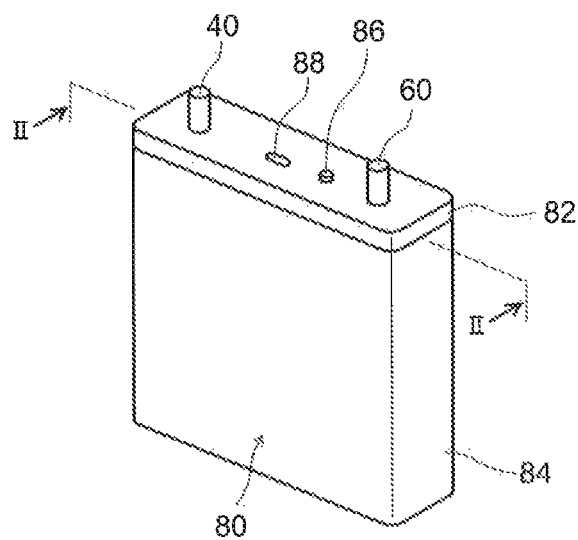
FIG. 1 is a perspective view schematically illustrating a nonaqueous electrolyte secondary battery according to an embodiment of the present invention.

In FIG. 1, the negative electrode in the non-aqueous electrolyte secondary battery according to the present invention has been described by referring to the example of the negative electrode for lithium ion batteries. However, the characteristic configurations of the present invention are not at all limited to the type and structure or materials such as the electrode active material of batteries.

<<Production Method of Negative Electrode for Secondary Batteries>>

Figure 6:
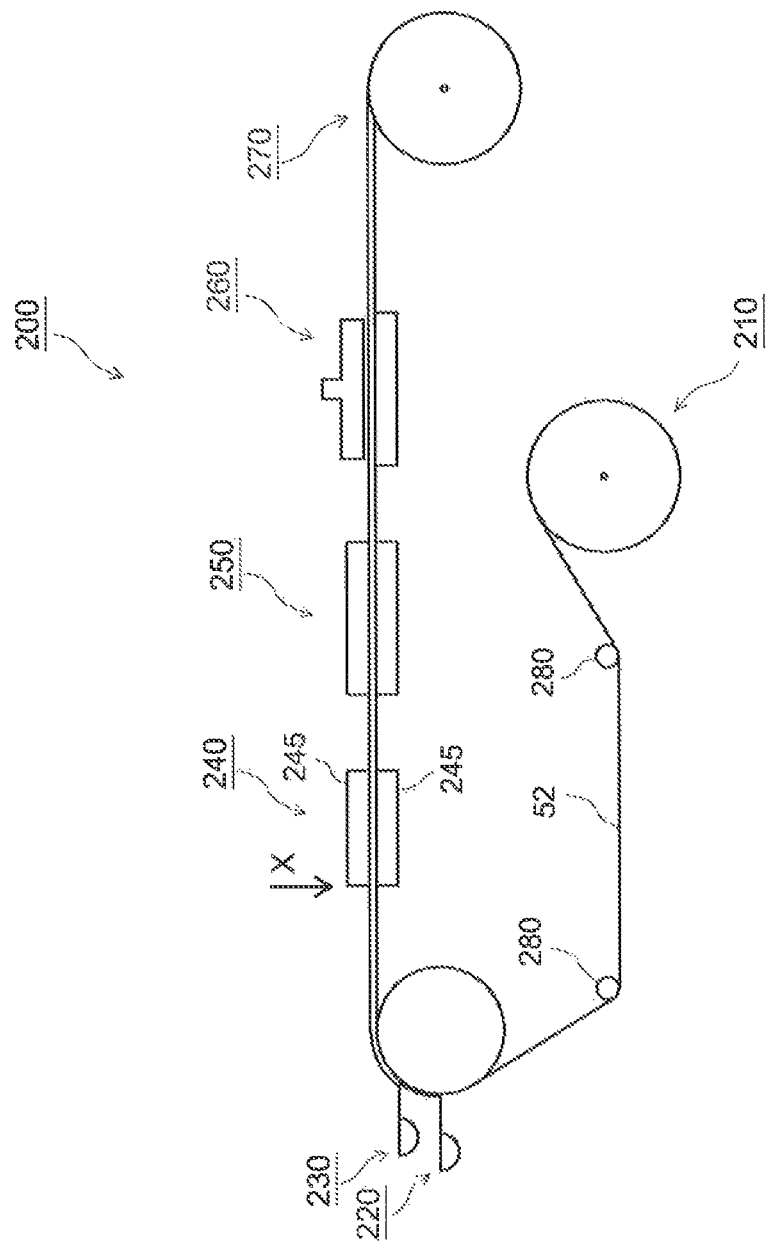
FIG. 6 is a schematic view illustrating an electrode production device according to an embodiment of the present invention.

The method for producing the negative electrode for secondary batteries according to an embodiment of the present invention is hereinafter described. The method for producing the negative electrode for secondary batteries typically includes: (1) the step of preparing a composition for forming a negative electrode active material layer; (2) the step of preparing a composition for forming a conductive base accumulated layer; (3) the step of applying the composition for forming a conductive base accumulated layer; (4) the step of applying the composition for forming a negative electrode active material layer to form a negative electrode active material layer; (5) the step of orientation; (6) the drying step; and (7) the pressing step, FIG. 6 is a view exemplifying a production device realizing the above production method in a line system. As shown in FIG. 6, a negative electrode production device 200 generally includes a feeding roll 210, an application device of the composition for forming a conductive base accumulated layer 220, an application device of the composition for forming a negative electrode active material layer 230, an orientation device 240, a drying furnace 250, a press (a pressure extension device) 260 and a drawing roll 270. The negative electrode current collector 52 is fed from the feeding roll 210, guided by a guide 280 so as to travel along a predetermined route of the above steps and collected at the drawing roll 270.

The step (1) of preparing a paste and the step (2) in the production method disclosed herein are first described.

In the step (1) of preparing a composition for forming a negative electrode active material layer, the composition for forming a negative electrode active material layer used for formation of the negative electrode active material layer 54 is prepared. The composition for forming a negative electrode active material layer contains the negative electrode active material 55 which can store and release at least the charge carriers and has shape anisotropy no that the charge carriers are stored and released along a predefined direction. Typically the composition for forming a negative electrode active material layer can be prepared by dissolving or dispersing the negative electrode active material 55 and the binder 58 in an appropriate solvent. The negative electrode active material 55 is not particularly limited as far as it has the above properties and is preferably a graphite material with flake shape or a graphite material with fibrous shape or both. These materials are preferable because they can be stably oriented in the composition for forming a negative electrode active material layer in the step of orientation described hereinbelow.

The composition for forming a negative electrode active material layer may contain, if necessary, one or two or more materials which are used as a constituent of a composition for forming a negative electrode active material layer in general non-aqueous electrolyte secondary batteries. An example of the material may include a binder 58 and a solvent. The binder 58 may be exemplified by, as described above, a styrene butadiene rubber (SBR), carboxymethylcellulose (CMC), polytetrafluoroethylene (PTFE), polyethylene (PE), polyacrylic acid (PZZ) and the like or may be a resin composition such as polyvinylidene fluoride (PVDF). The amount of the binder 58 relative to the negative electrode active material 55 in the composition for forming a negative electrode active material layer is not particularly limited and is preferably; in view of reducing resistance of the electrode, about 10 parts by mass or less, more preferably about 5 parts by mass or less and still more specifically about 2 parts by mass or less relative to 100 parts by mass of the negative electrode active material.

The polymer materials exemplified above as the binder 58 may be used with the purpose of exhibiting, in addition to the functionality as a binder, the functionalities as a thickening agent and other additives of the composition for forming a negative electrode active material layer.

The solvent to which the negative electrode active material 55 and the binder 58 are dispersed or dissolved may include organic solvents such as N-methylpyrrolidone (NMP), pyrrolidone, methyl ethyl ketone, methyl isobutyl ketone, cyclohexanone, toluene, dimethylformamide and dimethylacetamide or combinations of two or more thereof. The solvent may be water or a mixed solvent mainly containing water. The solvent contained in such a mixed solvent other than water may be one or two or more solvents appropriately selected from organic solvents which are uniformly miscible with water (lower alcohols, lower ketones, etc.). The amount of the solvent in the composition for forming a negative electrode active material layer is not particularly limited. However, in view of applicability, it is preferable to prepare the composition for forming a negative electrode active material layer (which may be prepared as slurry) so that it contains the solid material such as the negative electrode active material and the binder at about 30% by mass to 65% by mass and still more preferably 40% by mass to 55% by mass. Such solid matter content is suitable also from the view point that orientation of particles of the negative electrode active material 55 in the composition for forming a negative electrode active material layer can be facilitated in the step of orientation described hereinbelow.

A vehicle may be used in place of the above solvent.

The negative electrode active material and the binder may be mixed (kneaded) in the solvent in, for example, an appropriate kneading device (planetary mixer, homo Clearmix, Filmix, etc.). In order to prepare the paste composition, the negative electrode active material and the binder may be first kneaded with a small amount of the solvent and then the obtained product may be diluted with an appropriate amount of the solvent.

The thus provided composition for forming a negative electrode active material layer is fed to the application device of the composition for forming a negative electrode active material layer 230.

In the step (2) of preparing the composition for forming a conductive base accumulated layer, the composition for forming a conductive base accumulated layer used for formation of the conductive base accumulated layer 56 is prepared. The composition for forming a conductive base accumulated layer contains a minute conductive material 57 with granular shape and/or a minute conductive material 57 with fibrous shape having an average particle diameter that is at least smaller than that of the negative electrode active material 55. The composition for forming a conductive base accumulated layer can typically be provided by dispersing the minute conductive material 57 and the binder 58 in a suitable solvent (or a vehicle). The minute conductive material 57 is preferably carbon fibres having an average fibre diameter of 1 µm or less, or small particle diameter graphite powder having an average particle diameter of 1 µm or less. In the example shown in FIG. 5, the minute conductive material 57 used is vapour grown carbon fibres (VGCF). The vapour grown carbon fibres are microscopic carbon fibres formed with carbon nanotubes obtained by heat decomposition of hydrocarbons such as benzene in a gas phase. The vapour grown carbon fibres have an average cross section diameter (average fibre diameter D50) of about 0.5 µm to 0.25 µm. The vapour grown carbon fibres suitably have an average cross section diameter (average fibre diameter D50) of about 0.1 µm to 0.30 µm. The vapour grown carbon fibres used herein have a fibre length (average fibre length) or about 5 µm to 100 µm, suitably 1 µm to 20 µm. The average cross section diameter and the average fibre length of the vapour grown carbon fibres may be an average value of 10 or more fibres determined based on microscopic images (e.g., SEM images). The vapour grown carbon fibres may be commercially available vapour grown carbon fibres. The minute conductive material 57 is not limited to the vapour grown carbon fibres. For example, the minute conductive material 57 may be small particle diameter graphite powder which is smaller than the negative electrode active material 55. For example, the minute conductive material 57 may preferably be graphite powder having an average particle diameter of 2 µm or less (preferably about 1 µm). One or two or more in combination of these materials may be used. These materials are suitable because they can stably support the negative electrode active material 55 which is oriented in the step of orientation described hereinbelow.

The composition for forming a conductive base accumulated layer typically contains similar binder 58 and solvent as the composition for forming a negative electrode active material layer. The amount of the binder 58 relative to the minute conductive material 57 in the composition for forming a conductive base accumulated layer is not particularly limited and is preferably, in view of reducing resistance of the electrode, 10 parts by mass or less, more preferably 7 parts by mass or less and still more specifically 5 parts by mass or less relative to 100 parts by mass of the minute conductive material. The amount of the solvent in the composition for forming a conductive base accumulated layer is not particularly limited and in view of applicability, the solid material such as the minute conductive material and the binder in the composition for forming a conductive base accumulated layer (slurry) preferably accounts for about 35% by mass to 58% by mass. Such solid matter content suitably allows formation of the conductive base accumulated layer 56 having a desired form.

The composition for forming a conductive base accumulated layer can be prepared (kneaded) by the same manner as the composition for forming a negative electrode active material layer described above. The prepared composition for forming a conductive base accumulated layer is fed to the application device of the composition for forming a conductive base accumulated layer 220.

The base application step (3) is now described. The base application step includes applying the prepared composition for forming a conductive base accumulated layer on the surface of an elongated negative electrode current collector 52. The application device of the composition for forming a conductive base accumulated layer 220 applies, on the surface of the elongated negative electrode current collector 52 sent out from the feeding roll 210, the composition for forming a conductive base accumulated layer.

The negative electrode current collector 52 is suitably a conductive member formed with a metal having preferable conductivity, similar to current collectors used for negative electrodes of conventional lithium ion secondary batteries. For example, the negative electrode current collector 52 may be a copper material, a nickel material or an alloy material which is an elongated sheet mainly containing the above materials. The sheet-shaped negative electrode current collector 52 may be about 1 µm to 30 µm in thickness.

The application amount may be appropriately selected based on the solid matter content of the composition and the like. For example, the application amount may be in the range of about 1.5 mg/cm$^2$ to 3.0 mg/cm$^2$ as the weight after drying.

The step (4) of forming the negative electrode active material layer includes applying the composition for forming a negative electrode active material layer on the composition for forming a conductive base accumulated layer (applied product) applied in the step (3) before the applied composition for forming a conductive base accumulated layer is dried to form the negative electrode active material layer. The application device of the composition for forming a negative electrode active material layer 230 is arranged in the vicinity of the application device of the composition for forming a conductive base accumulated layer 220 and behind the negative electrode current collector 52 along the travelling direction.

The application amount may be appropriately selected based on the solid matter content of the composition. For example, the application amount may be in the range of about 7 mg/cm$^2$ to 9 mg/cm$^2$ as the weight after drying.

As shown in FIG. 6, the application devices of compositions 220 and 230 in the negative electrode production device 200 according to the present embodiment are die coaters. However, the application devices are not limited thereto and the composition for forming a conductive base accumulated layer and the paste for the active material may be sequentially applied in the same manner as preparation of electrodes (negative electrodes) for conventional and general lithium ion secondary batteries. For example, conventionally known appropriate application devices such as a slit coater, comma coater or gravure coater may be alternatively used.

The step of orientation (5) is now described. The step of orientation includes applying a magnetic field to the negative electrode active material layer formed in the step (4) (applied product of the composition for forming a conductive base accumulated layer and the composition for forming a negative electrode active material layer). The magnetic field is applied when the negative electrode active material layer (the applied product) on the negative electrode current collector 52 still contains the solvent without being dried. The magnetic field is applied so that the magnetic force lines are oriented to the direction orthogonal to the surface of the elongated negative electrode current collector 52.

In case of the negative electrode production device 200 shown in FIG. 6, the orientation device 240 includes a pair of magnetic field generators 245 opposingly provided so as to sandwich the negative electrode current collector 52 with the planes thereof. The magnetic field generators 245 are not particularly limited as far as they can generate a magnetic field and may include, for example, permanent magnets and magnet coils. The orientation device 240 includes, for example, the magnetic field generators 245 provided from the upper plane side of the negative electrode current collector 52 towards the lower plane side of the negative electrode current collector 52 (in the direction of the arrow X in FIG. 6) so that the orientation of the magnetic force lines is perpendicular to the surface of the negative electrode current collector 52.

Figure 7:
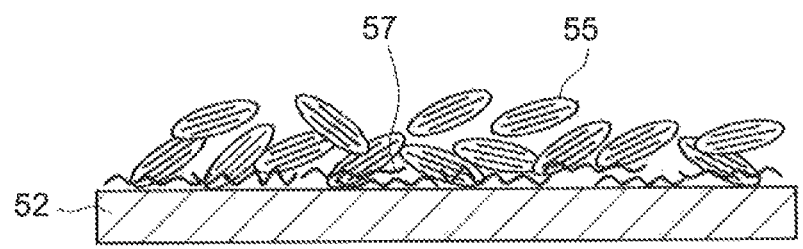
FIG. 7 is a schematic view locally illustrating a negative electrode prior to application of a magnetic field in the step of orientation.

FIG. 7 schematically illustrates the negative electrode active material layer (the applied product) in the vicinity of the negative electrode current collector 52 prior to application of a magnetic field. The composition for forming a conductive base accumulated layer applied on the negative electrode current collector 52 contains the minute conductive material 57. The minute conductive material 57 shown in FIG. 7 is fibres and thus the fibres are arranged so that the longitudinal direction thereof is laterally arranged on the current collector 52. The composition for forming a negative electrode active material layer applied on the composition for forming a conductive base accumulated layer contains the negative electrode active material 55. The composition for forming a negative electrode active material layer is applied before the composition for forming a conductive base accumulated layer is dried and thus no clear border is formed between the applied products of the respective compositions. The binder, solvent and the like which are not shown in the figure may be dispersed at the interface between the composition for forming a negative electrode active material layer and the composition for forming a conductive base accumulated layer. The negative electrode active material 55 are arranged so that the longitudinal direction thereof is laterally arranged (approximately parallel to the negative electrode current collector 52) due to shape anisotropy thereof.

Figure 8:
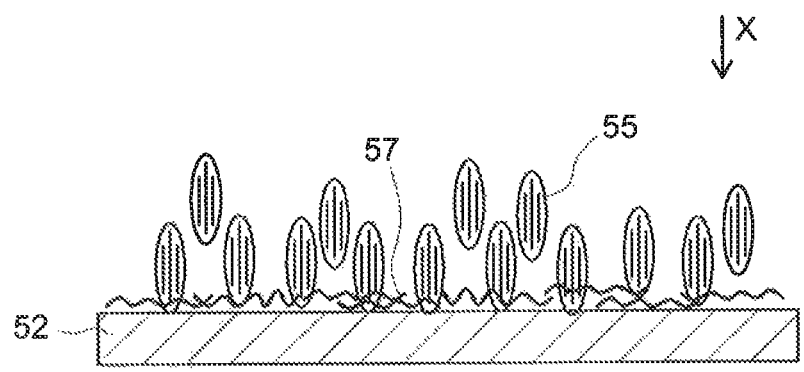
FIG. 8 is a schematic view locally illustrating a negative electrode after application of a magnetic field in the step of orientation.

FIG. 8 shows the applied product on the negative electrode current collector 52 to which a magnetic field has been applied. By applying the magnetic field along the direction of the arrow X, the negative electrode active material 55 are oriented so that the easy direction of magnetization aligns to the direction of the magnetic field. In the example shown in FIG. 8, due to shape magnetic anisotropy, the negative electrode active material 55 are oriented so that the longitudinal direction thereof is approximately perpendicular to the surface of the negative electrode current collector 52. The minute conductive material 57 which is fibres is not oriented because the resistance applied to the fibres is higher than the force for orientation applied by the magnetic field. Although it is not shown in FIG. 8, the minute conductive material 57 which is approximately spherical minute graphite particles may be oriented due to rotation and the like of the minute graphite particles at the positions thereof.

The drying step (6) may typically follow, for example, the step of orientation (5). In the drying step (6), while the negative electrode active material 55 are oriented, the applied composition for forming a conductive base accumulated layer and composition for forming a negative electrode active material layer are dried to form the negative electrode active material layer 54.

A drying device 250 shown in FIG. 6 may be arbitrarily selected from those conventionally used in production processes of general negative electrodes for non-aqueous electrolyte secondary batteries. For example, a hot air drying furnace (the present embodiment), an infrared drying furnace and the like may be used. The hot air drying furnace may apply heated gas from an appropriate heat source (e.g., a heater). The gas applied is not particularly limited and may be air or inert gas such as $N_2$ gas and He gas. By exposing the applied composition for forming a conductive base accumulated layer and composition for forming a negative electrode active material layer to a drying atmosphere with high temperature, the solvent is volatilized and removed. Accordingly, the negative electrode active material layer 54 can be obtained. The negative electrode current collector 52 having the formed negative electrode active material layer 54 is sent to the pressure extension step (7) along the traveling path.

The pressing step (7) may typically follow the step of orientation (5), for example. The step (7) may precede the drying step (6). In the press step (7), the pressure extension device (press) 260 extends (presses) the formed negative electrode active material layer 54 by applying pressure. The pressure extension device 260 may be arbitrarily selected from those conventionally used in production processes of general negative electrodes for non-aqueous electrolyte secondary batteries. For example, a roll press, a flat press (the present embodiment) and the like may be used. By the pressure extension step, the negative electrode active material layer 54 can be adjusted to have desired thickness or density. In a preferable embodiment, the negative electrode active material layer 234 may be adjusted in the pressure extension step to have a density of at least 1.5 $g/cm^3$ and more preferably 1.6 $g/cm^3$ to 2.0 $g/cm^3$, for example.

In the conventional production processes of negative electrodes, even when the negative electrode active material 55 are oriented along the direction approximately perpendicular to the surface of the negative electrode current collector 52 in the step of orientation (5), application of force to the negative electrode active material 55 along the direction approximately perpendicular to the surface of the negative electrode current collector 52 in the pressure extension step (7) may cause inclination or overturn of the negative electrode active material 55. Thus, the conventional processes result in disruption of perpendicular orientation of the negative electrode active material 55 relative to the negative electrode current collector 52. Thus in order to retain perpendicular orientation of the negative electrode active material 55, it has been required to add the binder at the amount that allows support of the negative electrode active material 55 in the negative electrode active material layer 54.

In contrast, according to the present embodiment the negative electrode active material 55 oriented along the direction approximately perpendicular to the surface of the negative electrode current collector 52 are supported by the minute conductive material 57 at the bottom of the negative electrode active material layer 54 and are densely arranged and support each other at the upper part of the negative electrode active material layer 54. Thus the negative electrode active material 55 are rarely overturned by pressure extension. By the pressure extension step (7) which applies pressure extension force, the negative electrode active material 55 can further penetrate into the gap of the minute conductive material 57 at the lower edge thereof and the negative electrode active material layer 54 may become further dense to be further firmly supported. According to the production method disclosed herein, the negative electrode 50 can be produced which contains the negative electrode active material 55 that retains high orientation. The negative electrode active material 55 is supported by the minute conductive material 57 and thus the amount of the binder in the negative electrode active material layer 54 can be reduced than usual. Accordingly the negative electrode 50 having reduced resistance can be produced.

The production method disclosed herein may include the step (A) of controlling the magnetic orientation, after the step of orientation degree (5), wherein the negative electrode active material layer 54 is measured for the glossiness or the brightness on the surface thereof, the state of orientation of the negative electrode active material 55 is evaluated based on the measured value and the intensity or duration or both of application of the magnetic field is adjusted so that the state of orientation of the negative electrode active material 55 is within a predetermined range. When the step of orientation (5) precedes the drying step (6), the step (A) of controlling the magnetic orientation degree may follow the drying step (6).

Figure 9:
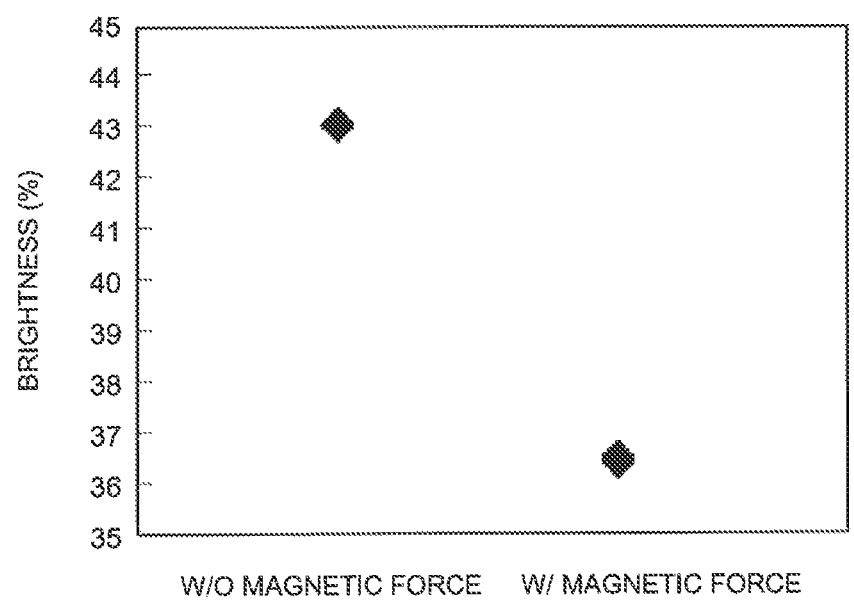
FIG. 9 is a view illustrating an example of effect of magnetic three on brightness of the negative electrode active material layer.
Figure 10:
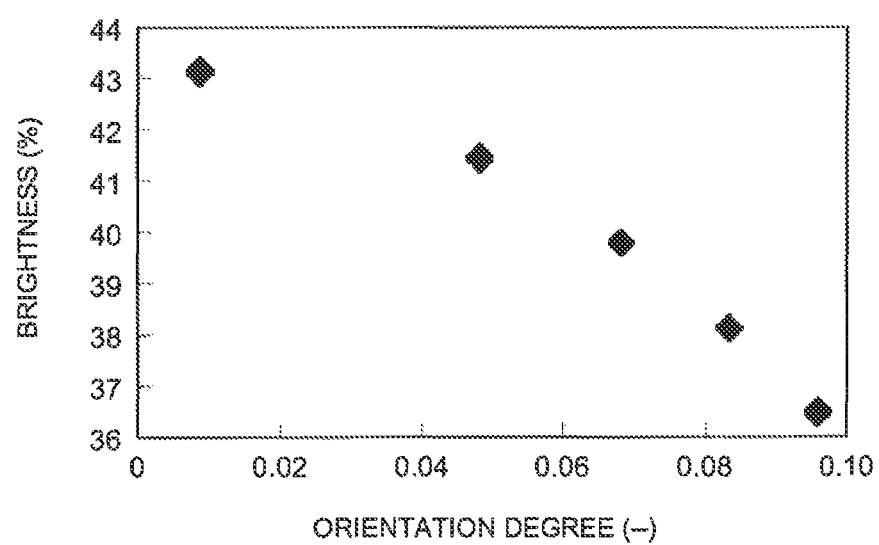
FIG. 10 is a view exemplifying the relationship between the orientation degree of the negative electrode active material and the brightness of the negative electrode active material layer.

When a magnetic field is applied in the step of orientation (5) to the negative electrode active material layer 54 formed in the step (4) of forming the negative electrode active material layer 54, the color of the negative electrode active material layer 54 darkly discolored, as gloss was taken off. This change in hue of the surface of the negative electrode active material layer 54 can be confirmed as a clear difference in the numerical value of glossiness and brightness. For example, the brightness of the surface of the negative electrode active material layer 54 is significantly different as shown in FIG. 9 between the negative electrode active material layers 54 obtained with and without the orientation treatment by application of a magnetic field. The change in the glossiness and brightness may, as shown in FIG. 10, reflect the state of orientation of the negative electrode active material 55. Namely, when the glossiness and brightness of the surface of the negative electrode active material layer 54 are decreased, the negative electrode active material 55 has an increased orientation degree. Thus by determining the glossiness or brightness (or both; the same applies to the following) of the surface of the negative electrode active material layer 54, the orientation degree of the negative electrode active material 55 can be evaluated. According to the glossiness or brightness of the surface of the negative electrode active material layer 54, application conditions of the magnetic field and the state of orientation of the negative electrode active material layer 541 can be correlatively evaluated.

The glossiness or brightness can be non-destructively, conveniently and immediately measured in situ with, for example, a gloss meter or a colour-difference meter. Thus when for example negative electrode active material layers 54 with certain compositions may be preliminarily determined for the relationship between the glossiness or brightness and the state of orientation (typically orientation degree) of a negative electrode active material 55, whether or not the state of orientation of a negative electrode active material 55 is within a desired range can be evaluated by measuring the glossiness or brightness of the surface of a negative electrode active material layer 54 during actual production processes. Suitable examples of the index for orientation degree may include the ratio I(110)/I(002) of the diffraction intensity of the (110) plane relative to the diffraction intensity of the (002) plane or the ratio I(110)/I(004) of the diffraction intensity of the (110) plane relative to the diffraction intensity of the (004) in X-ray diffraction of the surface of the negative electrode active material layer 54. The index may alternatively be the proportion of the negative electrode active material 55 having the (004) plane which is oriented to be 45° or more and 90° or less relative to the surface of the current collector 52. The evaluation may be carried out by, for example, providing an arbitrary threshold for the state of orientation of the negative electrode active material 55 and rating a negative electrode active material 55 having the orientation degree at or above the threshold as "fair" and the one having the orientation degree below the threshold as "requiring adjustment".

When the state of orientation is not within a desired range, the information may be reflected in other production steps and a production condition may be regulated so as to obtain the state of orientation within the desired range. For example, negative electrode active material layers 54 with certain compositions may be preliminarily examined for the relation between the glossiness or brightness and the intensity of a magnetic field applied to negative electrode active material layers and/or the duration of application of a magnetic field and the glossiness or brightness of the surface of a negative electrode active material layer 54 in actual production processes may be measured, so that a desired state of orientation of a negative electrode active material 55 may be achieved by adjusting (typically increasing) the intensity of a magnetic field applied to the negative electrode active material layer 54 or adjusting (typically increasing) the duration of application of a magnetic field. When the negative electrode 50 is produced by a line system, the duration of application of a magnetic field can be adjusted by adjusting the traveling speed in the line. It is preferred that control of a feed rate of the composition for forming a conductive base accumulated layer and the composition for forming a negative electrode active material layer or control of the drying temperature, for example, is simultaneously carried out.

A means for determination of the glossiness or brightness is not particularly limited and may be an instrument which allows convenient in situ measurement of the glossiness or brightness of an object such as various commercially available gloss meters or colour-difference meters. Gloss meters utilize the reflected intensity of light in measurement principle while colour-difference meters can measure hue and brightness with high sensitivity (high accuracy) and can detect the variation in hue of the negative electrode active material layer 54 (orientation degree of the negative electrode active material 55) with higher accuracy than gloss meters. Thus in the production method disclosed herein, it is preferred to use a colour-difference meter to determine the brightness and evaluate the state of orientation of the negative electrode active material 55 because it has higher accuracy for measurement of variation in hue (state of orientation) of the negative electrode active material layer 54. The colour-difference meter may be any of widely-used spectrophotometers based on spectrophotometric colorimetry and tristimulus colorimeters (colorimeters) based on tristimulus value direct reading method. It is more preferable to use spectrophotometers because the variation in hue of the negative electrode active material layer 54 can be more accurately determined.

Figure 11:
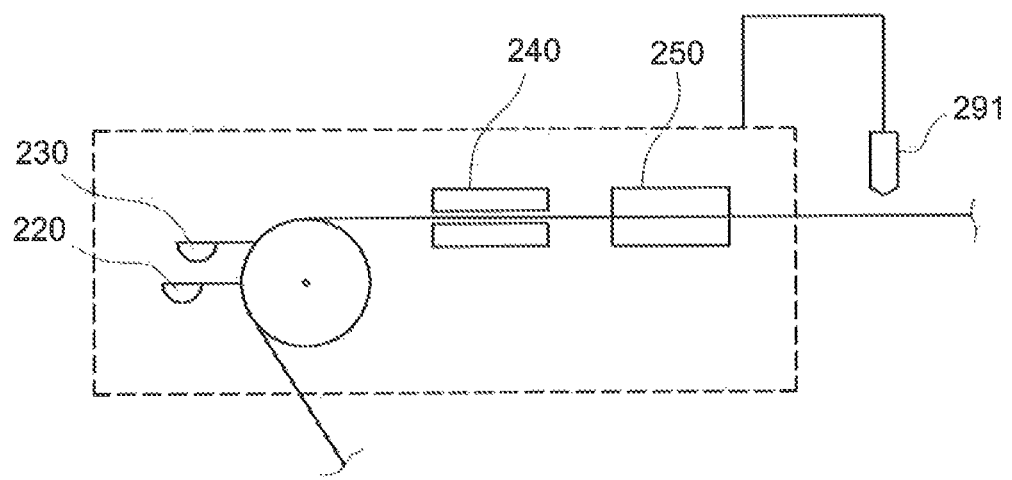
FIG. 11 is a view schematically illustrating a part of an electrode production device.

For example, when the negative electrode 50 is produced by a serial line system as shown in FIG. 6, a colour-difference meter 291 may be provided behind a drying furnace 250 in the line as shown in FIG. 11, so that the brightness of the surface of the negative electrode active material layer 54 after orientation and drying can be determined. When a negative electrode active material 55 has an orientation degree at or above a certain threshold, the negative electrode can be produced by the production condition without any change. On the other hand, when a negative electrode active material 55 has an orientation degree below a certain threshold, the condition of application of a magnetic field that provides the orientation degree of the negative electrode active material 55 at or above the certain threshold may be determined based on the measured value of the brightness from the colour-difference meter and the condition may be (preferably instantly) fed back to the orientation device 240 so as to adjust the application condition and increase the orientation degree.

In conventional production methods, the evaluation of the orientation degree of the negative electrode active material 55 requires excision of a specimen from the negative electrode to be evaluated after production thereof and X-ray diffraction analysis of the specimen, for example. Thus there have been problems of loss of the negative electrode 50 produced and necessity for time and effort for confirmation and adjustment of orientation conditions, in contrast, according to the invention disclosed herein, the glossiness or brightness of the surface of the negative electrode active material layer 54 can be instantly correlated to the state of orientation and orientation condition of the negative electrode active material 55, which allows inline confirmation, evaluation and control of the orientation degree of the negative electrode active material 55.

Further, the production method disclosed herein can include, after the pressure extension step (7), the step of controlling the state of compression (B) in which the negative electrode active material layer 54 is measured for the glossiness or brightness or both of the surface thereof, the state of compression of the negative electrode active material 55 is determined based on the measured value and the applied pressure extension condition is adjusted so that the density of the negative electrode active material 55 is within a predetermined range. The production method described hereinabove mainly relates to production of a negative electrode 50 including the step of orientation (5) of the negative electrode active material 55. However, the step of controlling the state of compression (B) can be also suitably applied to, for example, production of a positive electrode 30.

When pressure that is along the direction approximately perpendicular to the surface of the negative electrode active material layer 54 formed in the step (4) of forming the negative electrode active material layer 54 is applied in the pressure extension step (5), the negative electrode active material 55 in the negative electrode active material layer 54 are densely packed, for example, so that the negative electrode active material layer 54 has varied hue on the surface thereof. This change in hue of the surface of the negative electrode active material layer 54 can be confirmed as a clear difference in the numerical value of glossiness and brightness. This change may be confirmed for, for example, a negative electrode active material layer 54 subjected to the step of orientation (5) or for a negative electrode active material layer 54 without the step of orientation (5). The change can also be confirmed for a positive electrode active material layer 34 during production of a positive electrode 30.

When compression treatment is carried out by application of pressure, the density of the negative electrode active material layer 54 is increased and the thickness of the negative electrode active material layer 54 is decreased with progression of compression. In this case, the glossiness and brightness is also increased with an increase in density of the negative electrode active material layer 54, for example. Accordingly by measuring the glossiness or brightness (or both; the same applies to the following) of the surface of the negative electrode active material layer 54, the state of compression (density and thickness) by pressure extension of the negative electrode active material 55 can be evaluated.

The glossiness or brightness can be non-destructively, instantly and conveniently measured in situ on a gloss meter or a colour-difference meter as explained in the step of controlling the magnetic orientation degree (A). Thus when for example negative electrode active material layers 54 with certain compositions may be preliminarily determined for the relationship between the glossiness or brightness and the density of the negative electrode active material layers 54, whether or not the state of compression (typically density and thickness) is within a desired range can be evaluated by measuring the glossiness or brightness of the surface of a negative electrode active material layer 54 during actual production processes. The evaluation may be carried out by, for example, providing an arbitrary threshold on the state of compression of the negative electrode active material layer 54 and rating a negative electrode active material layer 54 having the density at or above the threshold as "fair" and the one having the density below the threshold as "requiring adjustment".

When the state of pressing is not in a desired range, the information may be reflected in the pressure extension step (7) and the pressure extension condition may be regulated so as to obtain the state of pressure extension within the desired range. For example, negative electrode active material layers 54 with certain compositions may be preliminarily examined for the relation between the glossiness or brightness and pressure applied to the negative electrode active material layers 54 and/or a press gap and the glossiness or brightness of the surface of a negative electrode active material layer 54 in actual production processes may be measured, so that a desired state of compression of a negative electrode active material 55 may be achieved by adjusting the intensity of pressure applied to the negative electrode active material layer 54 or adjusting the press gap.

Figure 12:
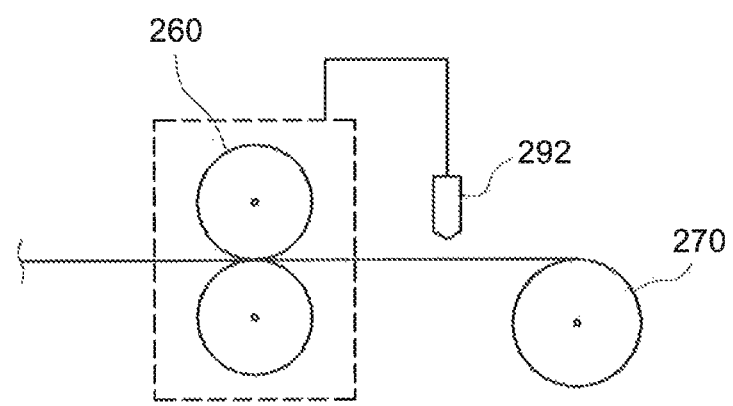
FIG. 12 is a view schematically exemplifying another part of the electrode production device.

For example, when the negative electrode 50 is produced by a serial line system as shown in FIG. 6, a colour-difference meter 292 may be provided behind a pressure extension device 260 in the line as shown in FIG. 12, so that the brightness of the surface of the negative electrode active material layer 54 after pressure extension can be determined. When a negative electrode active material 55 has a density at or above a certain threshold, the negative electrode can be produced by the production condition without any change. On the other hand, when a negative electrode active material 55 has a density below or above a certain threshold, the condition of application of pressure for extension that provides the density of the negative electrode active material 55 within the certain threshold range may be determined based on the measured value of the brightness from the colour-difference meter and the condition may be fed back to the pressure extension device 260 to adjust the pressure extension condition, in order to increase or decrease the density.

Accordingly, the state of compression of the negative electrode active material 55 can be controlled in-line. In FIG. 12, the pressure extension device 260 shown is a roll pressure extension device. However, the pressure extension device 260 is not limited thereto and may be a pressure extension device or other pressure extension devices as shown in FIG. 6.

The glossiness or brightness may be measured by similar method as the step of controlling the magnetic orientation degree (A). Namely, the determination of the glossiness or brightness is not particularly limited and may be carried out with various commercially available gloss meters or colour-difference meters. It is preferred to use a colour-difference meter to measure the brightness and evaluate the state of extension of the negative electrode active material 55 because it has higher accuracy for measurement of variation in hue according to the difference in density (thickness) of the negative electrode active material layer 54. It is alternatively preferred to use a spectrophotometer, for example.

In the production method of the negative electrode 50 disclosed herein which uses the negative electrode active material 55 having shape anisotropy, the orientation degree and the state of extension of the negative electrode active material layer 54, for example, may be easily reflected in the glossiness or brightness of the surface. However, the change in hue of the surface of the electrode by pressure extension may be utilized for production of any electrodes having various colours and shapes, without limited to those with the active material having such shape anisotropy. For example, the change in hue can be confirmed for a negative electrode active material 55 which is approximately spherical, blackgrey particles without shape anisotropy or for a positive electrode active material which is approximately spherical, dark brown particles. Thus, the step of controlling the state of compression (B) can be applied to production of electrodes of various non-aqueous electrolyte secondary batteries.

In conventional production methods, the evaluation of the density of the negative electrode active material layer 54 requires excision of a specimen from the negative electrode 50 to be evaluated after production thereof and measurements of dimension such as thickness and weight or of density of the negative electrode active material layer 54. Thus there have been problems of loss of the negative electrode 50 produced and necessity for time and effort for adjustment of pressure extension conditions. A method has been proposed in which at least one of wetting property, glossiness and conductivity of an electrode active material layer after production is measured to evaluate whether or not the prepared electrode is fair (see Patent Literature 3). However, the measurements of wetting property and conductivity require excision of a specimen from an electrode and evaluation thereof. In addition, this evaluation is to exclude only defective products due to defective electrodes. Thus this method still has a problem in loss of the negative electrode 50 produced and cannot reduce the loss. In contrast, in the invention disclosed herein, the glossiness or brightness of the surface of the negative electrode active material layer 54 is correlated to the state of compression of the negative electrode active material layer 54, and the correlation is fed back to the production line. Accordingly, in-line confirmation, evaluation and control of the density and thickness of the negative electrode active material layer 54 are possible.

<<Non-Aqueous Electrolyte Secondary Battery>>

An embodiment of the non-aqueous electrolyte secondary battery disclosed herein is hereinafter described by referring to the figures. In this embodiment, a lithium ion secondary battery including the negative electrode (negative electrode sheet) produced by the method for producing the negative electrode for secondary batteries described above is used as an example. However, it is not intended that the present invention is limited to the embodiment. Namely, as far as the negative electrode having the configuration disclosed herein is used, the composition, form and production method of the electrode active material used or the shape (outer shape and size) of the non-aqueous electrolyte secondary battery constructed are not particularly limited. A battery outer packaging case may be rectangular or cylindrical or may have a small button shape. Alternatively the outer packaging may be a thin sheet formed with a laminated film and the like. In the following embodiment, description is made for a rectangular battery.

Figure 2:
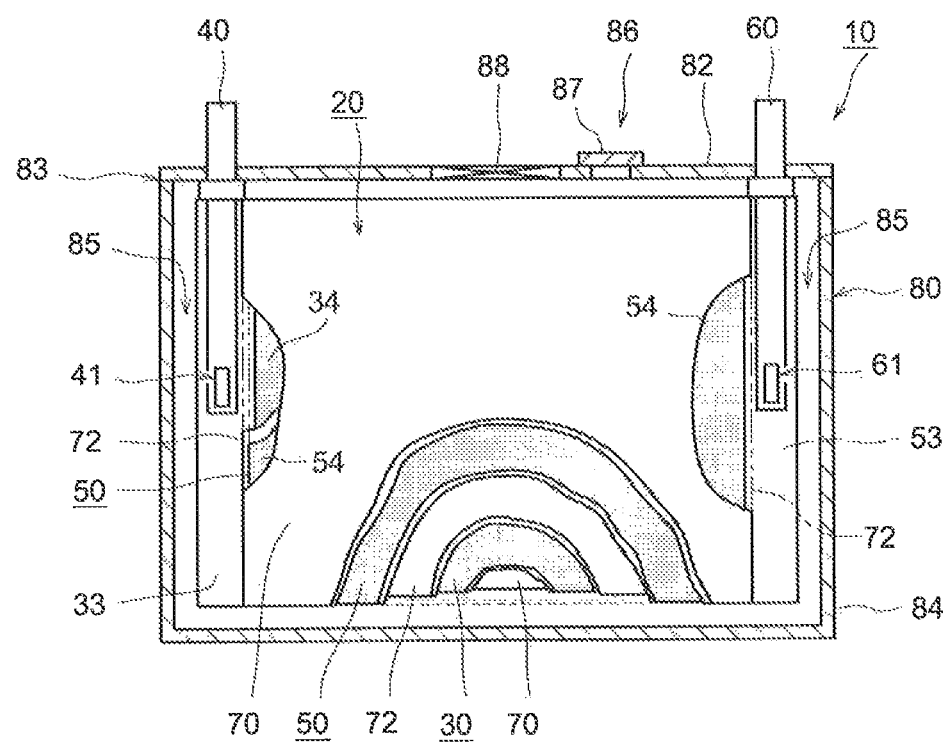
FIG. 2 is a section view taken along II-II in FIG. 1.
Figure 3:
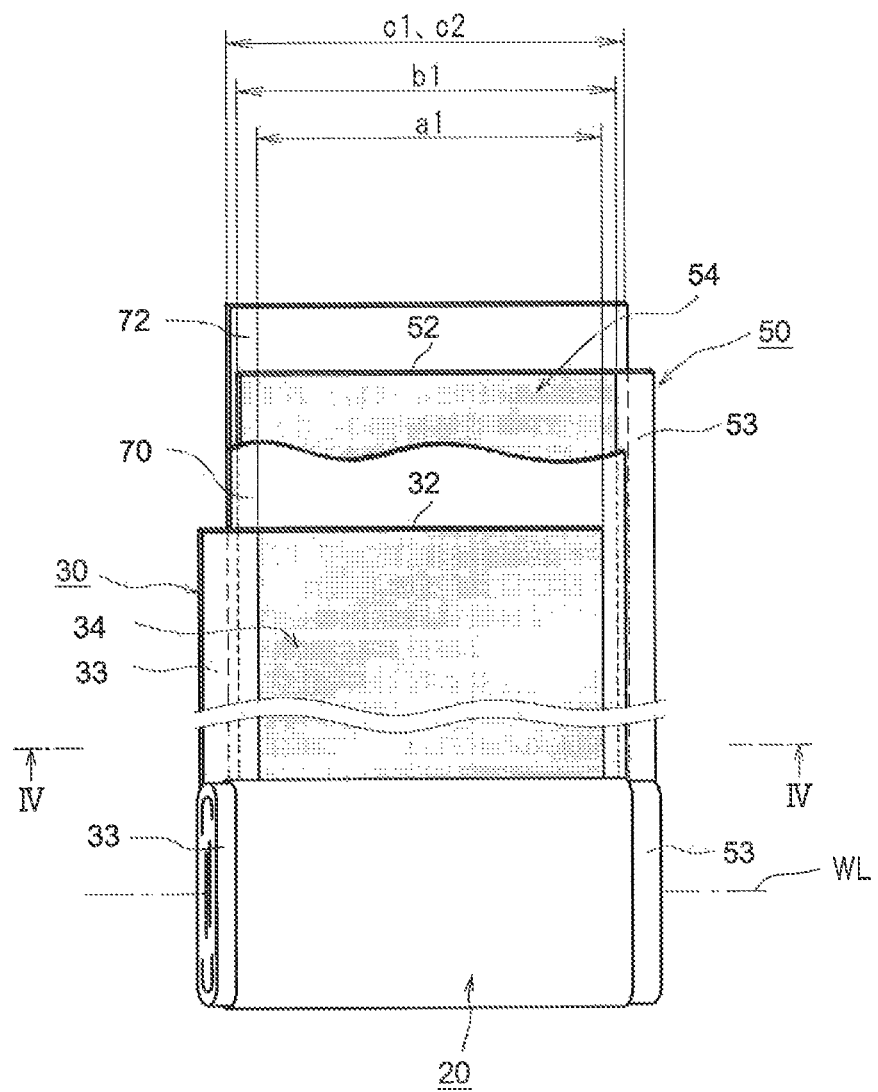
FIG. 3 is a schematic view illustrating a wound electrode assembly according to an embodiment of the present invention.
Figure 4:
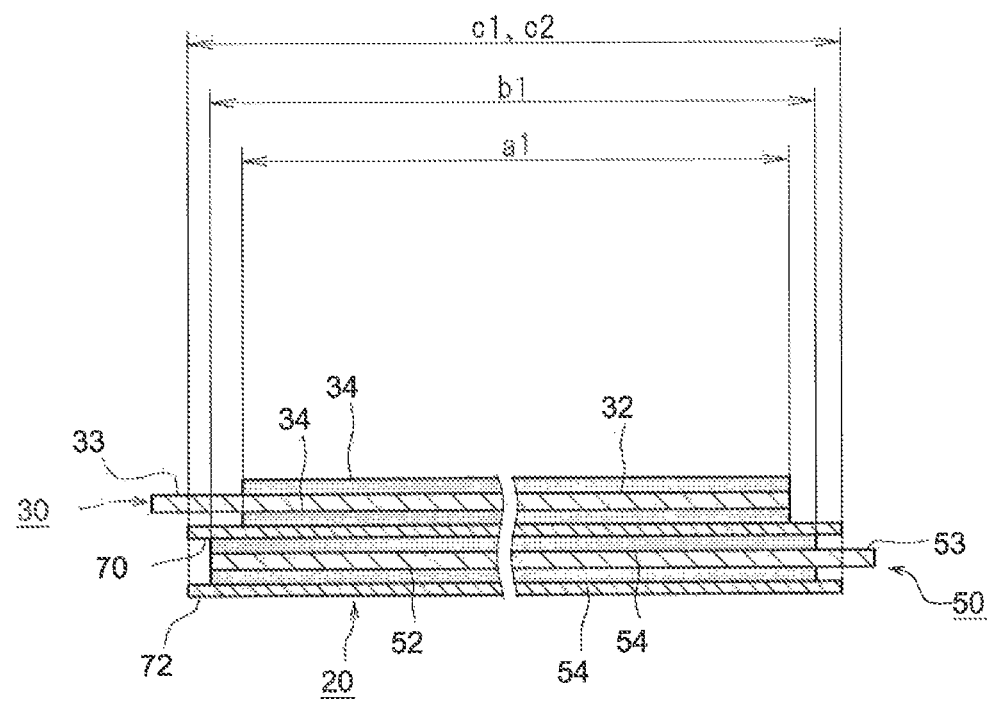
FIG. 4 is a section view taken along IV-IV in FIG. 3.

FIG. 1 is a perspective view showing an exterior appearance of a lithium ion secondary battery 10. FIG. 2 is a section view taken along II-II in FIG. 1. The lithium ion secondary battery 10 includes, as shown in FIG. 2, a wound electrode assembly 20 and a battery case 80. FIG. 3 is a view showing the configuration of the wound electrode assembly 20, FIG. 4 is a section view taken along IV-IV in FIG. 3.

The wound electrode assembly 20 has, as shown in FIG. 3, a belt-shaped positive electrode sheet 30, a negative electrode sheet 50 and separators 70 and 72.

<Positive Electrode Sheet 30>

The positive electrode sheet 30 includes a belt-shaped positive electrode current collector 32 and a positive electrode active material layer 34. The positive electrode current collector 32 may suitably contain a metal foil suitable for positive electrodes, in this embodiment, the positive electrode current collector 32 contains a belt-shaped aluminium foil having a predetermined width and a thickness of about 1 μm. The positive electrode current collector 32 has an uncoated part 33 defined along one edge in the width direction. The positive electrode active material layer 34 is formed on both sides of the positive electrode current collector 32 except for the uncoated part 33 defined on the positive electrode current collector 32. The positive electrode current collector 32 carries the positive electrode active material layer 34 which contains at least a positive electrode active material. In this embodiment, the positive electrode active material layer 34 contains the positive electrode active material, a conductive material and a binder. The positive electrode active material layer 34 is formed by applying a composition for forming a positive electrode active material layer containing a positive electrode active material, a conductive material and a binder on the positive electrode current collector 32.

<Positive Electrode Active Material>

The positive electrode active material may be a substance which can be used as positive electrode active materials of lithium ion secondary batteries 10. The positive electrode active material may include a substance that can store and release lithium and may include without limitation one or two or more substances selected from various substances which have been conventionally used for lithium secondary batteries. For the positive electrode active material, a lithium-transition metal oxide (typically particles) is suitably used and typically an oxide with laminar structure or an oxide with spinel structure may be appropriately selected. For example, one or two or more lithium-transition metal oxides selected from lithium nickel oxides (typically LiNiO$_2$), lithium cobalt oxides (typically LiCoO$_2$) and lithium manganese oxides (typically LiMn$_2$O$_4$) are preferably used.

The term "lithium nickel oxides" as used herein means that this term encompasses, in addition to oxides containing Li and Ni as constituent metal elements, composite oxides containing one or two or more metal elements other than Li and Ni (i.e., transition metal elements other than Li and Ni and/or representative metal elements) at a proportion lower than that of Ni (in terms of number of atoms; when two or more metal elements other than Li and Ni are contained, all proportions are lower than that of Ni). Such metal elements may be, for example, one or two or more elements selected from the group consisting of Co, Al, Mn, Cr, Fe, V, Mg, Ti, Zr, Nb, Mo, W, Cu, Zn, Cu, In, Sn, La and Ce.

The lithium nickel oxide may alternatively be so-called ternary lithium-excess transition metal oxides containing three transition metal elements such as those represented by the general formula:

$$Li(Li_aMn_xCo_yNi_z)O_2$$

(wherein a, x, y and z are real numbers satisfying a+x+y+z=1)

and so-called solid solution lithium-excess transition metal oxides represented by the general formula:

$$xLi[Li_{1/3}Mn_{2/3}]O_2 \cdot (1-x)LiMeO_2$$

(wherein Me is one or two or more transition metals and x satisfies 0<x≤1).

The positive electrode active material may alternatively be polyanion compounds represented by the general formula LiMAO$_4$ (wherein M is at least one metal element selected from the group consisting of Fe, Co, Ni and Mn and A is an element selected from the group consisting of P, Si, S and V).

The compound which forms the positive electrode active material can be prepared, for example, by well known methods. For example, more than one material compound appropriately selected according to the composition of a desired positive electrode active material are mixed at predetermined proportion and the mixture is calcinated with an appropriate means. Accordingly the oxide which is a compound forming the positive electrode active material can be prepared. The present invention is not at all characterized by the method per se for preparing the positive electrode active material (typically a lithium-transition metal oxide).

Although the shape or the like of the positive electrode active material is not strictly limited, the thus prepared positive electrode active material can be ground, granulated and classified by an appropriate means. For example, the positive electrode active material used in the technology disclosed herein may preferably be lithium-transition metal oxide powder which is substantially formed with secondary particles having an average particle diameter within the range of about 1 µm to 25 µm (typically about 2 to 15 µm). Accordingly the granular positive electrode active material powder which is substantially formed with secondary particles having a desired average particle diameter and/or particle size distribution.

<Conductive Material>

The conductive material may be the same material as the minute conductive material 57 used for production of the negative electrode 50. The conductive material may be exemplified by carbon materials such as carbon powder and carbon fibres. One or two or more in combination selected from these conductive materials may be used. Carbon powder may be various carbon black (e.g., acetylene black, oil furnace black, graphitized carbon black, carbon black, graphite, ketjen black), graphite powder and the like.

<Binder>

The binder may also be the same material as the one used for production of the negative electrode 50. The binder 630 may be a polymer which is soluble or dispersible in a solvent used. For example, a paste for positive electrode active material containing an aqueous solvent may preferably contain a water soluble or water dispersible polymer such as cellulose polymers including carboxymethylcellulose (CMC), hydroxypropyl methylcellulose (HPMC) and the like or polyvinyl alcohol (PVA), fluororesins including polytetrafluoroethylene (PTFE), tetrafluoroethylene-hexafluoropropylene copolymers (FEP), vinyl acetate copolymers and rubbers including styrene butadiene copolymers (SBR), acrylic acid modified SBR resins (SBR latex). A paste for positive electrode active material containing a non-aqueous solvent may preferably contain polymers such as polyvinylidene fluoride (PVDF), polyvinylidene chloride (PVDC) and polyacrylonitrile (PAN).

<Thickening Agent, Solvent>

The positive electrode active material layer 34 can be formed by preparing a paste (slurry) composition for forming a positive electrode active material layer containing the positive electrode active material and the conductive material mixed with a solvent or vehicle, applying the paste on a positive electrode current collector 32, drying and extending thereof by applying pressure. In this case, the solvent contained in the composition for forming a positive electrode active material layer may typically be any of aqueous solvents and non-aqueous solvents. Suitable examples of non-aqueous solvents may include N-methyl-2-pyrrolidone (NMP). The polymer materials exemplified as the binder above may be used with a purpose of exhibiting, in addition to the functionality as a binder, the functionalities as a thickening agent and other additives of the composition for forming a positive electrode active material layer.

The proportion by mass of the positive electrode active material in the total mass of the paste for positive electrode active material is preferably about 50% by mass or more (typically 50% by mass to 95% by mass) and more preferably about 70% by mass to 95% by mass (e.g., 75% by mass to 90% by mass). The proportion of the conductive material in the total amount of the paste for the positive electrode active material may be, for example, about 2% by mass to 20% by mass and preferably about 2% by mass to 15% by mass. In the composition including a binder, the proportion of the binder in the total amount of the paste for the positive electrode active material may be, for example, about 1% by mass to 10% by mass and preferably about 2% by mass to 5% by mass.

<Negative Electrode Sheet 50>

In this embodiment, the negative electrode sheet 50 is the one prepared by the method for producing the negative electrode for secondary batteries as described above. Thus the negative electrode sheet 50 used in this embodiment includes the negative electrode active material layer 54 on the negative electrode current collector 52. The negative electrode active material layer 54 has, at a lower layer thereof (on the side of the negative electrode current collector 52), the conductive base accumulated layer 56 containing the minute conductive material 57. In the upper layer other than the conductive base accumulated layer 56, the negative electrode active material 55 are oriented so that the direction of storage and release of the charge carriers is approximately perpendicular to the surface of the negative electrode current collector 52. the negative electrode active material 55 in the vicinity of the conductive base accumulated layer 56 are partially supported by the minute conductive material 57 while they are oriented. Thus even when an external force is applied to batteries during production or usage, the orientation of the negative electrode active material 55 may not be disrupted, the negative electrode active material 55 in the vicinity of the conductive base accumulated layer 56 are partially supported by the minute conductive material 57 while they are oriented, and the negative electrode active material 55 in the upper layer are attached with a binder while they are densely arranged with the aligned orientation. Thus the amount of the binder required for the negative electrode active material layer 54 may be reduced and the negative electrode sheet 50 with low resistance may be provided.

<Separators 70 and 72>

The separators 70 and 72 are, as shown in FIG. 2 to FIG. 4, members that separate the positive electrode sheet 30 from the negative electrode sheet 50. The separators 70 and 72 may be the same separators as conventional separators. For example, a porous sheet formed with a resin (microporous resin sheet) may be preferably used. The constituent material of the porous sheet may preferably be polyolefin resins such as polyethylene (PE), polypropylene (PP) and polystyrene. Particularly, porous polyolefin sheets such as PE sheets, PP sheets, bilayer sheets containing a PE layer and a PP layer stacked together, trilayer sheets containing one PE layer between two PP layers may be suitably used. When the electrolyte is solid electrolyte or gel electrolyte, the separator may not be required (namely, in this case, the electrolyte itself may function as a separator). In this example, the separators 70 and 72 are belt-shaped sheet materials having a plurality of micropores and having a predetermined width. As shown in FIG. 2 to FIG. 4, the negative electrode active material layer 54 has width b1 that is slightly higher than width a1 of the positive electrode active material layer 34. The separators 70 and 72 have width c1 and c2 that are slightly higher than width b1 of the negative electrode active material layer 54 (c1, c2>b1>a1).

<Battery Case 80>

In this example, the battery case 80 is, as shown in FIG. 1, a so-called rectangular battery case and includes a container main body 84 and a lid 82. The container main body 84 is a flat box-shaped container which is a rectangular tube with a bottom and has an opening on one side (upper surface). The lid 82 is a member which is attached at the opening (opening on the upper surface) of the container main body 84 and closes the opening.

Secondary batteries for vehicles are required to have improved weight energy efficiency (capacity of batteries per unit weight) in order to improve fuel consumption of vehicles. Therefore in this embodiment, the container main body 84 and the lid 82 which form the battery case 80 contain a lightweight metal such as aluminium and aluminium alloys. Thereby the weight energy efficiency can be improved.

The battery case 80 has a flat rectangular inner space for accommodating the wound electrode assembly 20. As shown in FIG. 2, the flat inner space of the battery case 80 is slightly wider than the wound electrode assembly 20. A positive electrode terminal 40 and a negative electrode terminal 60 are attached to the lid 82 of the battery case 80. The positive and negative electrode terminals 40 and 60 penetrate the battery case 80 (lid 82) to be exposed to outside of the battery case 80. The lid 82 also contains a safely valve 88.

<Wound Electrode Assembly 20>

The wound electrode assembly 20 has the belt-shaped positive electrode sheet 30, the negative electrode sheet 50 and the separators 70 and 72.

Upon preparation of the wound electrode assembly 20, the positive electrode sheet 30 and the negative electrode sheet 50 are stacked with the separators 70 and 72 therebetween. The positive electrode sheet 30 and the negative electrode sheet 50 are overlaid with being displaced in the width direction so that the uncoated part 33 on the positive electrode active material layer 34 of the positive electrode sheet 30 and the uncoated part 53 on the negative electrode active material layer 54 of the negative electrode sheet 50 are respectively protrude from both sides of the separator separators 70 and 72 in the width direction. The thus stacked laminate is wound and the wound product is squashed from the side direction to prepare the flat wound electrode assembly 20.

The wound electrode assembly 20 has, at a centre portion in the winding axis (WL) direction, a wound core portion (namely a portion where the positive electrode active material layer 34 of the positive electrode sheet 30, the negative electrode active material layer 54 of the negative electrode sheet 50 and the separators 70 and 72 are densely stacked) is formed. On each edge of the wound electrode assembly 20 in the winding axis direction, the uncoated parts 33 and 53 of the positive electrode sheet 30 and the negative electrode sheet 50 protrude outward from the wound core portion. The positive electrode-side protrusion portion (namely the portion where the positive electrode active material layer 34 is not formed) and the negative electrode-side protrusion portion (namely the portion where the negative electrode active material layer 54 is not formed) are provided with a positive electrode lead terminal 41 and a negative electrode lead terminal 61, respectively; to be electrically connected respectively to the positive electrode terminal 40 and the negative electrode terminal 60. Due to the difference in materials, the positive electrode terminal 40 and the positive electrode current collector 32 are connected by, for example, ultrasonic welding while the negative electrode terminal 60 and the negative electrode current collector 52 may be connected by, for example, resistance welding. The wound electrode assembly 20 is, as shown in FIG. 2, accommodated in a flat inner space of the container main body 84. The container main body 84 is closed with the lid 82 after accommodation of the wound electrode assembly 20. A joint 83 (see FIG. 1) between the lid 82 and the container main body 84 may be sealed by, for example, laser welding. Accordingly in this example, the wound electrode assembly 20 is positioned in the battery case 80 by the positive electrode terminal 40 and the negative electrode terminal 60 fixed to the lid 82 (battery case 80).

<<Electrolyte Solution>>

Thereafter an electrolyte solution is injected into the battery case 80 through a liquid injection hole 86 provided on the lid 82. The electrolyte solution used herein may be without limitation one or two or more non-aqueous electrolyte solutions which are used for conventional lithium secondary batteries. The non-aqueous electrolyte solution typically contains an electrolyte (i.e., lithium salt) in an appropriate non-aqueous solvent. The concentration of the electrolyte is not particularly limited and the non-aqueous electrolyte solution which contains the electrolyte at about 0.1 mol/L to 5 mol/L (preferably about 0.8 mol/L to 1.5 mol/L) may be preferably used. The electrolyte solution may be an electrolyte solution in solid form (gel form) which contains a polymer in the electrolyte solution in liquid form.

The non-aqueous solvent may be aprotic solvents such as carbonates, esters, ethers, nitriles, sulphones and lactones. For example, ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulphoxide, sulpholane, γ-butyrolactone and the like may be mentioned. The electrolyte may also be exemplified by $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ and the like.

An overcharge preventing agent contained in the electrolyte solution may be a compound without limitation which has an oxidation potential that is at or higher than the running voltage (which is for example 4.2 V or more for a lithium secondary battery which is fully charged at 4.2 V) of a lithium secondary battery and which generates a high amount of gas upon oxidation. However, a compound having an oxidation potential that is similar to the running voltage of a battery may gradually be decomposed even at a normal running voltage due to a local increase in voltage. In contrast, when the decomposition voltage is 4.9 V or higher, thermal runaway may be generated due to reaction of the main component in a non-aqueous electrolyte solution and an electrode material before gas generation due to oxidative decomposition of the additive. Accordingly, in a lithium secondary battery which is fully charged at 4.2 V, the overcharge preventing agent having an oxidation reaction potential in the range of 4.6 V or higher and 4.9 V or lower is preferably used. For example, biphenyl compounds, cycloalkylbenzene compounds, alkylbenzene compounds, organophosphorous compounds, fluorine atom-substituting aromatic compounds, carbonate compounds, cyclic carbamate compounds, alicyclic hydrocarbons and the like may be mentioned. More specifically, biphenyl (BP), alkylbiphenyl, terphenyl, 2-fluorobiphenyl, 3-fluorobiphenyl, 4-fluorobiphenyl, 4,4'-difluorobiphenyl, cyclohexylbenzene (CHB), trans-butyl cyclohexylbenzene, cyclopentylbenzene, t-butylbenzene, t-aminobenzene, o-cyclohexylfluorobenzene, p-cyclohexylfluorobenzene, tris-(t-butylphenyl)phosphate, phenylfluoride, 4-fluorophenyl acetate, diphenyl carbonate, methyl phenyl carbonate, bis tertiary butylphenyl carbonate, diphenyl ether, dibenzofuran and the like may be mentioned. Particularly, cyclohexylbenzene (CHB) and cyclohexylbenzene derivatives may be preferably used. The amount of the overcharge preventing agent relative to 100% by mass of the electrolyte solution may be, for example, about 0.01 to 10% by mass (preferably about 0.1 to 5% by mass).

In this example, the electrolyte solution used contains about 1 mol/liter of $LiPF_6$ in a mixed solvent (e.g., a mixed solvent with the volume ratio of about 1:1) of ethylene carbonate and diethyl carbonate. Thereafter a metal sealing cap 87 is attached (e.g., by welding) to the liquid injection hole to seal the battery case 80.

<<Vacancy>>

The positive electrode active material layer 34 and the negative electrode active material layer 54 have minute gaps which may also be referred to as hollows between particles of the electrode active materials and the conductive materials. The electrolyte solution (not shown) may penetrate into the minute gaps. The gaps (hollows) are herein appropriately referred to as "vacancy". Thus the electrolyte solution penetrates into the positive electrode active material layer 34 and the negative electrode active material layer 54 in the lithium ion secondary battery 10.

<<Gas Venting Path>>

In this example, the flat inner space of the battery case 80 is slightly wider than the flat, deformed wound electrode assembly 20. Gaps 85 are provided on both sides of the wound electrode assembly 20 and between the wound electrode assembly 20 and the battery case 80. The gaps 85 serve as gas venting paths. For example, when the temperature of the lithium ion secondary battery 10 is abnormally increased upon overcharge and the like, the electrolyte solution may be decomposed and gas may be generated abnormally. In the embodiment, the abnormally generated gas may be smoothly exhausted through the gaps 85 on both sides of the wound electrode assembly 20 and between the wound electrode assembly 20 and the battery case 80 and the safety valve 88 to outside of the battery case 80.

In the lithium ion secondary battery 10, the positive electrode current collector 32 and the negative electrode current collector 52 are electrically connected to an external device through the electrode terminals 40 and 60 penetrating the battery case 80. Accordingly, the lithium ion secondary battery which is a non-aqueous electrolyte secondary battery is provided.

In the non-aqueous electrolyte secondary battery disclosed herein, it is important that the negative electrode active material 55 having shape anisotropy are arranged while they are oriented and are supported by the minute conductive material 241 in the conductive base accumulated layer 56. Thus a means for orienting the negative electrode active material 55 is not necessarily limited to an external magnetic field. Further the negative electrode active material 55 is not limited to the material which is oriented by a magnetic field. For example, the negative electrode active material 55 may be oriented by a kind of external field or a kind of action.

The present invention is now described more specifically by way of Examples. However, it is not intended that the present invention is limited to Examples,

[Positive Electrode Sheet 1]

A Ni-containing lithium-transition metal composite oxide ($LiNiCoAlO_2$) which is a positive electrode active material, AB (acetylene black) which is a conductive material and PVdF (polyvinylidene fluoride) which is a binder were mixed at a mass ratio of 100:5:5 in N-methylpyrrolidone (NMP) which is a solvent to prepare a paste for a positive electrode. The paste for a positive electrode was applied on both sides of an Al foil having a thickness of 5 μm which is a current collector so as to obtain an areal weight of 15 $mg/cm^2$ per side. After drying, the current collector was pressed to the total thickness of 100 μm to prepare a positive electrode (positive electrode sheet) 1. The positive electrode 1 is cut into a length of 3000 m and is subjected to assembly of a battery.

[Separator]

The separator used was a porous film having a thickness of 20 van and three-layer structure of polypropylene (PP)/polyethylene (PE)/polypropylene (PP).

[Electrolyte Solution]

The non-aqueous electrolyte solution used contained about 1 mol/liter of $LiPF_6$ which is a supporting salt in a mixed solvent containing ethylene carbonate (EC), dimethyl carbonate (DMC) and ethyl methyl carbonate (EMC) at a volume ratio of 3:4:3.

[Negative Electrode Sheet 1]

Seven different negative electrodes (negative electrodes 1 to 7) were prepared by applying on a current collector a composition for forming a conductive base accumulated layer 1 or a composition for forming a conductive base accumulated layer 2 and a composition for forming a negative electrode active material layer 1 or a composition for forming a negative electrode active material layer 2 in predetermined combinations and subjecting the products to orientation treatment under different conditions.

The composition for forming a conductive base accumulated layer 1 was prepared by mixing multilayer carbon nanotubes (Showa Denko K.K., VGCF) which is a minute conductive material synthesized by vapour phase epitaxy and having an average fibre diameter of about 0.15 μm and a fibre length of 10 to 20 μm, a styrene butadiene rubber (SBR) which is a binder and carboxymethylcellulose (CMC) which is a thickening agent at a mass ratio of 100:0.2:0.2 in water.

The composition for forming a conductive base accumulated layer 2 was prepared by a similar manner as a negative electrode paste 1 except that the minute conductive material used was obtained by mixing VGCF which is the same as the negative electrode paste 1 and small particle diameter graphite powder obtained by grinding artificial graphite (TIMCAL, KS-4) having an average particle diameter of 4 μm to adjust the average particle diameter to 1.5 μm at a mass ratio of 85:15.

The composition for forming a negative electrode active material layer 1 was prepared by mixing flake natural graphite (Hitachi Chemical Co., Ltd.) having an average particle diameter of about 1 μm which is a negative electrode active material, a styrene butadiene rubber (SBR) which is a binder and carboxymethylcellulose (CMC) which is a thickening agent at a mass ratio of 100:0.5:0.5 in water.

The composition for forming a negative electrode active material layer 2, was prepared by using the same composition as the one for the composition for forming a negative electrode active material layer 1 except that the negative electrode active material was obtained by mixing flake natural graphite (Hitachi Chemical Co., Ltd.) having an average particle diameter of about 1 μm and multilayer carbon nanotubes (Shown Denko K.K., VGCF) synthesized by vapour phase epitaxy and having an average fibre diameter of about 0.15 μm and a fibre length of 10 to 20 μm at a mass ratio of 85:15, and thoroughly dispersing and mixing the components in water in a speed mixer.

(Negative Electrode 1)

On a Cu foil having a thickness of 20 μm which is a current collector, the composition for forming a conductive base accumulated layer 1 was applied on both sides at an areal weight of 1.8 mg/cm$^2$ per side and then the composition for forming a negative electrode active material layer 1 was applied on both sides at an areal weight of 9 ing/cm$^2$ per side. Before the paste was dried, a magnetic field having magnetic force lines perpendicular to the surface of the current collector was applied by using an orientation device 240 (magnets 245) shown in FIG. 6. Namely, the magnets 245 were arranged at positions 10 cm distant from the surfaces of the composition for forming a negative electrode active material layer and a magnetic field of 0.75 T was applied by moving the negative electrode sheet between the magnets 245. The magnetic field was applied for 10 seconds. After drying the negative electrode active material layer, the negative electrode was extended by applying pressure (pressed) so that the total thickness thereof was 120 μm and the negative electrode active material layer had a density of about 1.5 g/cm$^3$ to prepare a negative electrode 1 (negative electrode sheet) having negative electrode active material layers on both sides of the negative electrode current collector. The negative electrode 1 is cut into a length of 3300 m and is subjected to assembly of a battery.

(Negative Electrode 2)

A negative electrode 2 was prepared by the same manner as preparation of the negative electrode 1 except that a base paste 2 was used instead of the composition for forming a conductive base accumulated layer 1.

(Negative Electrode 3)

A negative electrode 3 was prepared by the same manner as preparation of the negative electrode 1 except that the negative electrode was pressed so that the negative electrode active material layer had a density of about 1.2 g/cm$^3$. Because of reduction in the density of the negative electrode active material layer, the negative electrode had an increased total thickness. Thus in order to align the volume, the negative electrode 7 was cut into a length of a sheet of 3100 m and used.

(Negative Electrode 4)

A negative electrode 4 was prepared by the same manner as preparation of the negative electrode 1 except that the composition for forming a conductive base accumulated layer 1 was not applied and only the composition for forming a negative electrode active material layer 1 was applied and the magnetic field was not applied.

(Negative Electrode 5)

A negative electrode 5 was prepared by the same manner as preparation of the negative electrode 1 except that the composition for forming a conductive base accumulated layer 1 was not applied and only the composition for forming a negative electrode active material layer 1 was applied.

(Negative Electrode 6)

A negative electrode 6 was prepared by the same manner as preparation of the negative electrode 1 except that the magnetic field was not applied.

(Negative Electrode 7)

A negative electrode 7 was prepared by the same manner as preparation of the negative electrode 1 except that the composition for forming a conductive base accumulated layer 1 and the composition for forming a negative electrode active material layer 1 were not applied and the composition for forming a negative electrode active material layer 2 was applied at an areal weight of 9 mg/cm$^2$.

[Evaluation of Orientation by X-Ray Diffraction]

The negative electrodes 1 to 7 were analysed for the crystal structure on the surface of the negative electrodes by X-ray diffraction. The measurement was carried out according to the out-of-plane method which gives diffraction patterns due to lattice planes parallel to the sample surface. Based on the obtained diffraction patterns, the ratio I(110)/I(004) of the diffraction intensity belonging to the (110) plane relative to the diffraction intensity belonging to the (004) plane was calculated which results are shown in Table 1. The I(110)/I(004) represents the proportion between the (004) plane parallel to the sample surface and the (110) plane. Thus a higher value means that the (004) plane is more perpendicular to the surface of the active material layer.

[Lithium Ion Battery]

The respective negative electrodes 1 to 7 and the positive electrode 1 were wound with 2 separator sheets existing therebetween and the wound product was squashed from the side direction to prepare the respective flat wound electrode assemblies. The thus obtained wound electrode assemblies were placed in metal box-shaped battery cases together with electrolyte solution and the openings of the battery cases were sealed so as to be air tight to construct type 18650 lithium ion batteries (samples 1 to 7). For the battery (sample 3) containing the negative electrode 3, the positive electrode and the separator were also shortened at the same ratio.

[Initial Capacity Measurement]

The thus obtained test lithium ion batteries (samples 1 to 7) were subjected to 3 cycles of charge and discharge under a temperature of 25° C. and charge terminal voltage of 4.1 V, discharge terminal voltage of 3.0 V and constant current of 1.4 A. The discharge capacity after the third cycle was measured as the initial capacity which is indicated in Table 1.

[Direct Current Resistance Measurement]

After initial capacity was measured, the batteries of the samples 1 to 7 were respectively adjusted to the SOC (state of charge) of 50% and subjected to IV characteristics test to determine the input direct current internal resistance (DC-IR). Namely, charge pulse current (C1) of 0.3 C for 10 seconds was applied to the batteries of the samples 1 to 7 adjusted to the SOC of 50% and the terminal voltage (V1) at the 10th second was measured. Then the batteries of the samples 1 to 7 which were again adjusted to the SOC of 50% were charged with increasing pulse current (C1) stepwise from 1C, 3C, 5C to 10C in this order and the terminal voltage (V1) at the 10th second at each current value was measured. The obtained data, i.e., terminal voltage (V1) was plotted against pulse current (C1), the straight-line approximation was performed on V1 according to the least-square method and the slope thereof was calculated as the direct current internal resistance (DC-IR). The obtained direct current internal resistance is indicated in Table 1 as DC-IR.

[Table 1]

TABLE 1

| Sample | DC-IR (mΩ) | Discharge capacity (Ah) | I(110)/I(004) |
|---|---|---|---|
| 1 | 2.1 | 4.62 | 0.91 |
| 2 | 2.2 | 4.61 | 0.90 |
| 3 | 2.1 | 4.05 | 0.91 |
| 4 | 3.7 | 4.61 | 0.1 |
| 5 | 3.4 | 4.63 | 0.3 |
| 6 | 3.0 | 4.61 | 0.2 |
| 7 | 2.5 | 4.32 | 0.8 |

As apparent from Table 1, it was found that the sample 1 prepared by the production method disclosed herein has the direct current internal resistance of as low as 2.1 mΩ and has excellent input and output characteristics. Because of the I(110)/I(004) as high as 0.91, it was found that the orientation control of the active material by the magnetic field is retained even after pressure extension to the density of 1.5 g/cm$^3$ and the effect thereby is exhibited as excellent input and output characteristics.

It was found that the sample 2 prepared by the production method disclosed herein resulted in similar results as the sample 1 and provided a battery having low direct current internal resistance and excellent input and output characteristics.

The sample 3 prepared by the production method disclosed herein also showed the direct current internal resistance as low as 2.1 mΩ and the I(110)/I(004) as high as 0.91 which values were as similarly preferable as those of samples 1 and 2. However, because of less extension amount compared to the samples 1 and 2, discharge capacity was as low as 4.05 mΩ although the effect due to orientation was obtained. Comparing the results of samples 1 to 3, it is confirmed that the electrodes having the configurations disclosed herein show almost no reduction in orientation even when the compression treatment is provided by pressure extension because the negative electrode active material having shape anisotropy are firmly supported by the conductive base accumulated layer.

In contrast, the sample 4 had the direct current internal resistance of 3.7 mΩ which was the highest and the I(110)/I(004) of 0.1 which was the lowest. This is believed to be due to no application of the composition for forming a conductive base accumulated layer 1 on the sample 4 which caused significant reduction in current collection between the current collector and the negative electrode active material layer as well as to no application of the magnetic field which caused deposition of active material flakes parallel to the substrate by means of pressure extension and an increase in the direct current internal resistance.

The sample 5 had the direct current internal resistance of 3.4 mΩ which was the highest and the I(110)/I(004) as low as 0.3. This is believed to indicate that due to no application of the composition for forming a conductive base accumulated layer 1 even though orientation treatment by application of the magnetic field was carried out, the active material were collapsed by extension to significantly reduce the orientation.

The sample 6 to which the magnetic field was not applied had the direct current internal resistance of 3.0 mΩ which was rather high and the I(110)/I(004) as low as 0.2, which results corresponded to inferior input and output characteristics.

The sample 7 showed low discharge capacity, although the direct current internal resistance was rather low as 2.5 mΩ and the I(110)/I(004) was as high as 0.8. The reduction in discharge capacity may be believed to be due to use of the composition for forming a negative electrode active material layer which contained small particle diameter graphite (VGCF) and flake natural graphite mixed without separation and thereby an increase in the specific surface area of the negative electrode and an increase in irreversible capacity, although the orientation degree may be relatively high because of orientation treatment by application of the magnetic field.

[Evaluation of Orientation by Brightness Measurement]
[Negative Electrode Sheet 2]
(Negative Electrodes 8 to 12)

A composition for forming a negative electrode active material layer 3 was prepared by mixing flake natural graphite (Hitachi Chemical Co., Ltd.) having an average particle diameter of about 1 μm which is a negative electrode active material, a styrene butadiene rubber (SBR) which is a binder and carboxymethylcellulose (CMC) which is a thickening agent at a mass ratio of 100:2:1 in water.

On a Cu foil having a thickness of 20 μm which is a current collector, the composition for forming a negative electrode active material layer 3 was applied on one side at an areal weight of 9 mg/cm$^2$, to which 5 different intensities of magnetic fields were applied followed by drying and extension by applying pressure to prepare negative electrodes 8 to 12 each having different orientation degree of the negative electrode active material.

The obtained negative electrodes 8 to 12 were subjected to X-ray diffraction analysis of the surface and the results were used to calculate the ratio I(110)/I(002) of the diffraction intensity belonging to the (110) plane relative to the diffraction intensity belonging to the (002) plane. It was confirmed from these results that an increase in the intensity of the magnetic field applied resulted in an increase in the orientation degree of the negative electrode active material. The obtained negative electrodes 8 to 12 were measured for the brightness using a spectrophotometer. The relationship between the brightness and the orientation degree obtained from these results is shown in FIG. 10. The orientation degree on the horizontal axis in FIG. 10 corresponds to the I(110)/I(002).

From FIG. 10, a strong correlation between the orientation degree and the brightness was demonstrated. In addition, as shown in FIG. 9 for example, it was found that based on the relationship between the intensity of the magnetic field and the brightness, the intensity of a magnetic field which allows achievement of a desired orientation degree can be deduced by measuring the brightness.

It was also demonstrated that by evaluating whether or not the state of extension of the negative electrode active material layer 54 is suitable based on the brightness of the surface of the negative electrode active material layer 54 and feeding the result back to the production line, in-line confirmation, evaluation as well as control of the density and thickness of the negative electrode active material 55 can be carried out.

[Evaluation of Density by Brightness Measurement]
[Positive Electrode Sheet 2]

Lithium nickel manganese cobalt composite oxide particles (LiNi$_{1/3}$Co$_{1/3}$Mn$_{1/3}$O$_2$) which is a positive electrode active material, carbon black (DENKA black) which is a conductive material and PVdF (polyvinylidene fluoride) which is a binder were mixed at a mass ratio of 100:4:1 in N-methylpyrrolidone (NMP) which is a solvent to prepare a paste for a positive electrode. The paste for a positive electrode was applied on both sides of an Al foil having a thickness of 5 μm which is a current collector so as to obtain an areal weight of 15 mg/cm² per side.

After drying, the current collector was pressed to the total thickness of 100 μm to prepare a positive electrode (positive electrode sheet).

Figure 13:
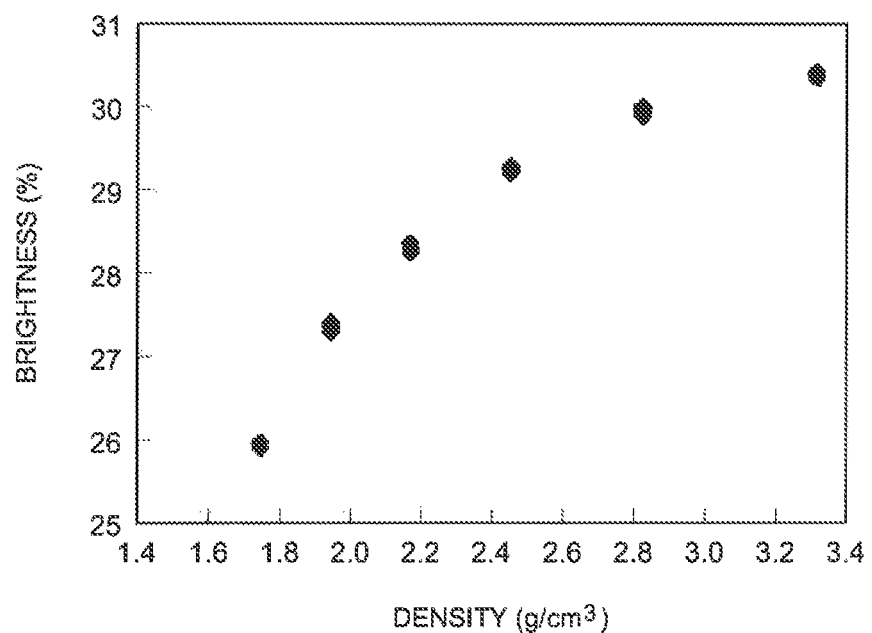
FIG. 13 is a view exemplifying the relationship between the density and brightness of a positive electrode active material layer.

The obtained positive electrode was subjected to pressure extension under 6 different conditions. Thus 6 different positive electrodes 2, to 7 having different state of extension were prepared by varying pressure in 6 levels. These positive electrodes 2 to 7 were measured for brightness with a spectrophotometer. The density was calculated from the thickness and weight of a unit area of the positive electrode active material layer. The relation between the density and the brightness of the positive electrode active material layers in the positive electrodes 2 to 7 obtained from these results is shown in FIG. 13. From FIG. 13, it was demonstrated that there is a strong correlation between the brightness and the density (thickness) of the positive electrode active material layer. For example, when the relation between extension conditions (pressure, press gap, etc.) and the density of the positive electrode active material layer is preliminarily determined, the density of the positive electrode active material can be revealed by measuring the brightness, so that the extension conditions for achieving a desired density can be obtained.

In addition, because the brightness can be measured instantly as described above, feeding the result back to the pressure extension device allows in-line control of the density and thickness of the electrode active material layer.

The present invention has been described by way of suitable embodiments hereinabove. However, the above description is not limiting and can be of course variously modified.

Figure 14:
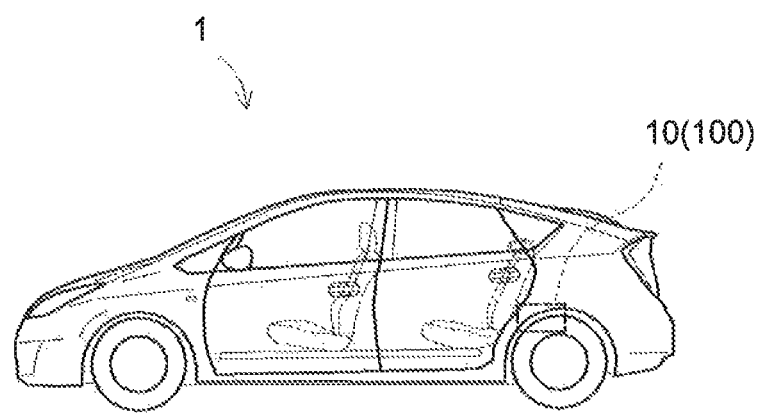
FIG. 14 is a side view illustrating a vehicle including a lithium secondary battery according to an embodiment of the present invention.

Any non-aqueous electrolyte secondary battery disclosed herein has suitable performance as batteries for vehicles and power sources for electric power storage systems and particularly has low resistance and excellent input and output characteristics. Thus the present invention may provide a vehicle 1, as shown in FIG. 14, including any lithium ion battery 10 disclosed herein (which may be an assembled battery 100 including a plurality of non-aqueous electrolyte secondary batteries mutually connected). Particularly the present invention provides a vehicle (e.g., automobile) 1 including the non-aqueous electrolyte secondary battery as a power source (typically a power source for hybrid vehicles, plug-in hybrid vehicles, fuel cell vehicles or electric vehicles).

INDUSTRIAL APPLICABILITY

The present invention can provide the non-aqueous electrolyte secondary battery containing the negative electrode which includes the negative electrode active material arranged at a high density while being oriented and has low resistance and excellent input and output characteristics and a suitable method for producing the negative electrode.

REFERENCE SIGNS LIST

1 Vehicle
10 Lithium ion battery
20 Wound electrode assembly
30 Positive electrode sheet (positive electrode)
32 Positive electrode current collector
33 Uncoated part
34 Positive electrode active material layer (electrode active material layer)
38 Binder
40 Positive electrode terminal
50 Negative electrode sheet (negative electrode)
52 Negative electrode current collector
53 Uncoated part
54 Negative electrode active material layer (electrode active material layer)
55 Negative electrode active material
56 Conductive base accumulated layer
57 Minute conductive material
58 Binder
60 Negative electrode terminal
70, 72 Separator
80 Battery case
82 Lid
83 Joint
84 Container main body
85 Gap
86 Liquid injection hole
87 Sealing cap
88 Safety valve
100 Assembled battery
200 Negative electrode production device
210 Feeding roll
220 Application device of the composition for forming a conductive base accumulated layer
230 Application device of the composition for forming a negative electrode active material layer
240 Orientation device
245 Magnetic field generator
250 Drying furnace
260 Pressure extension device
270 Drawing roll
280 Guide
291, 292 Colour-difference meter
WL Winding axis

The invention claimed is:

1. A non-aqueous electrolyte secondary battery, comprising:
a positive electrode, a negative electrode and a non-aqueous electrolyte,
the negative electrode including a negative electrode current collector, and a negative electrode active material layer formed on the current collector,
the negative electrode active material layer containing a negative electrode active material capable of storing and releasing charge carriers and having shape anisotropy so that the charge carriers are stored and released along a predefined direction, wherein
the negative electrode active material layer comprises a conductive base accumulated layer at a bottom of the negative electrode active material layer contacting the current collector,
the conductive base accumulated layer has more conductive material with at least one of granular shape and fibrous shape having an average particle diameter that is smaller than an average particle diameter of the negative electrode active material accumulated than other regions of the negative electrode active material layer,
at least 50% by number of a total amount of the negative electrode active material is oriented so that a direction of storage and release of the charge carriers is at an angle of 45° or more and 90° or less relative to a surface of the current collector, and a lower end of a part of the negative electrode active material enters into the conductive base accumulated layer and is supported by the conductive base accumulated layer so as to maintain its orientation.

2. The non-aqueous electrolyte secondary battery according to claim 1, wherein
the conductive material is at least one of a fibrous carbon material having an average fibre diameter of 1 μm or less and a granular carbon material having an average particle diameter of 1 μm or less.

3. The non-aqueous electrolyte secondary battery according to claim 1, wherein the negative electrode active material is a graphite material with flake shape or a graphite material with fibrous shape and at least 50% by number of the graphite material in the negative electrode active material layer is oriented so that an angle of the (004) plane thereof relative to the surface of the current collector is 45° or more and 90° or less.

4. The non-aqueous electrolyte secondary battery according to claim 3, wherein the negative electrode active material layer has a ratio I(110)/I(004) of a diffraction intensity of the (110) plane relative to a diffraction intensity of the (004) plane in X-ray diffraction of the surface thereof, of 0.6 or more and 1.0 or less.

5. The non-aqueous electrolyte secondary battery according to claim 1, wherein the negative electrode active material layer has a density of at least 1.5 g/cm$^3$.

6. The non-aqueous electrolyte secondary battery according to claim 1, wherein the negative electrode active material layer contains a binder at 1.0 part by mass or less relative to 100 parts by mass of the negative electrode active material.

7. A vehicle comprising the secondary battery according to claim 1.

8. A method for producing a negative electrode for a secondary battery comprising a negative electrode active material layer formed on a negative electrode current collector, the method comprising:
preparing a composition for forming a negative electrode active material layer containing a negative electrode active material capable of storing and releasing charge carriers and having shape anisotropy so that the charge carriers are stored and released along a predefined direction;
preparing a composition for forming a conductive base accumulated layer containing at least one of a granular conductive material and a conductive material with fibrous shape having an average particle diameter that is smaller than an average particle diameter of the negative electrode active material;
applying the composition for forming a conductive base accumulated layer on a given negative electrode current collector;
applying, before the composition for forming a conductive base accumulated layer applied on the current collector is dried, the composition for forming a negative electrode active material layer on the applied composition for forming a conductive base accumulated layer to form the negative electrode active material layer; and
applying, to the negative electrode active material layer, a magnetic field having magnetic force lines aligned in a direction orthogonal to the surface of the current collector in order to orient the negative electrode active material,
wherein:
at least 50% by number of the total amount of the negative electrode active material is oriented so that a direction of storage and release of the charge carriers is at an angle of 450 or more and 900 or less relative to the surface of the current collector,
the conductive base accumulated layer has more conductive material with at least one of granular shape and fibrous shape having an average particle diameter that is smaller than an average particle diameter of the negative electrode active material accumulated than other regions of the negative electrode active material layer, and
a lower end of a part of the negative electrode active material enters into the conductive base accumulated layer and is supported by the conductive base accumulated layer so as to maintain its orientation.

9. The method according to claim 8, wherein at least one of a fibrous carbon material having an average fibre diameter of 1 μm or less and a granular carbon material having an average particle diameter of 1 μm or less is used as the conductive material.

10. The method according to claim 8, wherein: a graphite material with flake shape or a graphite material with fibrous shape is used as the negative electrode active material, and the graphite material is oriented in the step of orientation so that an angle of the (004) plane of at least 50% by number of the graphite material in the negative electrode active material layer is 45° or more and 90° or less relative to the surface of the current collector.

11. The method according to claim 10, wherein the negative electrode active material are oriented in the step of orientation so that the negative electrode active material layer has a ratio I(110)/I(004) of a diffraction intensity of the (110) plane relative to a diffraction intensity of the (004) plane in X-ray diffraction of the surface thereof, of 0.6 or more and 1.0 or less.

12. The method according to claim 8, wherein the magnetic field applied in the step of orientation has an intensity of 0.5 T or more.

13. The method according to claim 8, further comprising: pressing the negative electrode active material layer obtained after the step of orientation so that the negative electrode active material layer has a density of at least 1.5 g/cm$^3$.

14. The method according to claim 8, wherein the composition for forming a negative electrode active material layer contains a binder at 1.0 part by mass or less relative to 100 parts by weight of the negative electrode active material.

15. A method for producing a non-aqueous electrolyte secondary battery, comprising: preparing a positive electrode, a negative electrode and a non-aqueous electrolyte and assembling a non-aqueous electrolyte secondary battery by using the positive electrode, the negative electrode and the non-aqueous electrolyte, wherein the negative electrode is produced by the method according to claim 8.

* * * * *